United States Patent
Yoshimura et al.

(10) Patent No.: US 9,521,312 B2
(45) Date of Patent: Dec. 13, 2016

(54) FOCUS DETECTION APPARATUS, CONTROL METHOD FOR THE SAME, AND IMAGE CAPTURE APPARATUS

(71) Applicant: CANON KABUSHIKI KAISHA, Tokyo (JP)

(72) Inventors: Yuki Yoshimura, Tokyo (JP); Koichi Fukuda, Tokyo (JP); Junichi Saito, Kawasaki (JP); Hideaki Takamiya, Yokohama (JP); Yoshihito Tamaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/814,775

(22) Filed: Jul. 31, 2015

(65) Prior Publication Data
US 2016/0044230 A1 Feb. 11, 2016

(30) Foreign Application Priority Data
Aug. 5, 2014 (JP) ................................. 2014-159765

(51) Int. Cl.
*H04N 5/232* (2006.01)
*H04N 5/369* (2011.01)
*G02B 7/34* (2006.01)
*H04N 5/357* (2011.01)

(52) U.S. Cl.
CPC ........ *H04N 5/23212* (2013.01); *H04N 5/3572* (2013.01); *G02B 7/34* (2013.01); *H04N 5/3696* (2013.01); *H04N 2209/046* (2013.01)

(58) Field of Classification Search
None
See application file for complete search history.

(56) References Cited

U.S. PATENT DOCUMENTS

| 8,885,089 B2* | 11/2014 | Aoki | G02B 7/34 |
| | | | 348/208.12 |
| 8,913,175 B2* | 12/2014 | Nagano | G02B 3/0056 |
| | | | 348/273 |
| 9,106,826 B2* | 8/2015 | Aoki | H04N 5/23212 |
| 9,185,317 B2* | 11/2015 | Nakagawa | G02B 7/34 |
| 9,197,808 B2* | 11/2015 | Hamano | H04N 5/23212 |
| 9,288,384 B2* | 3/2016 | Aoki | G02B 7/34 |

(Continued)

FOREIGN PATENT DOCUMENTS

| JP | 3592147 B | 11/2004 |
| JP | 2013-025246 A | 2/2013 |

*Primary Examiner* — Michael Osinski
(74) *Attorney, Agent, or Firm* — Cowan, Liebowitz & Latman, P.C.

(57) ABSTRACT

Signals of pixels are acquired from an image sensor in which a first pixel, a second pixel, and an imaging pixel are arranged, the first pixel receiving light flux that is restricted to light flux passing through a first portion of a pupil area of an imaging optical system, the second pixel receiving light flux that is restricted to light flux passing through a second portion that is different from the first portion of the pupil area, and the imaging pixel being different from the first and second pixels. Based on the acquired signals, estimated signals at a position at which the first and second pixel is not arranged are estimated. A defocus amount of the imaging optical system is calculated based on evaluation values obtained based on the estimated signals and the signals from the first and second pixels.

18 Claims, 16 Drawing Sheets

(56) References Cited

U.S. PATENT DOCUMENTS

| | | | |
|---|---|---|---|
| 2009/0128671 A1* | 5/2009 | Kusaka | H04N 5/23212 348/246 |
| 2009/0153705 A1* | 6/2009 | Katsuda | H04N 9/045 348/273 |
| 2012/0033128 A1* | 2/2012 | Nagano | G02B 7/34 348/349 |
| 2012/0147227 A1* | 6/2012 | Yoshimura | G02B 7/346 348/246 |
| 2012/0162493 A1* | 6/2012 | Wakamiya | H04N 5/3696 348/345 |
| 2012/0194721 A1* | 8/2012 | Sakaida | H04N 5/23212 348/302 |
| 2014/0198239 A1* | 7/2014 | Suzuki | H04N 5/23212 348/246 |
| 2015/0092098 A1* | 4/2015 | Konishi | H04N 5/2352 348/333.11 |
| 2015/0181108 A1* | 6/2015 | Endo | G02B 7/34 348/345 |
| 2015/0195446 A1* | 7/2015 | Saito | H04N 5/23219 348/353 |
| 2015/0256738 A1* | 9/2015 | Inoue | G02B 7/34 348/362 |
| 2015/0281556 A1* | 10/2015 | Hamano | G02B 7/34 348/353 |
| 2015/0281558 A1* | 10/2015 | Tamaki | H04N 5/3696 348/208.12 |
| 2016/0021299 A1* | 1/2016 | Endo | H04N 5/23212 348/345 |

\* cited by examiner

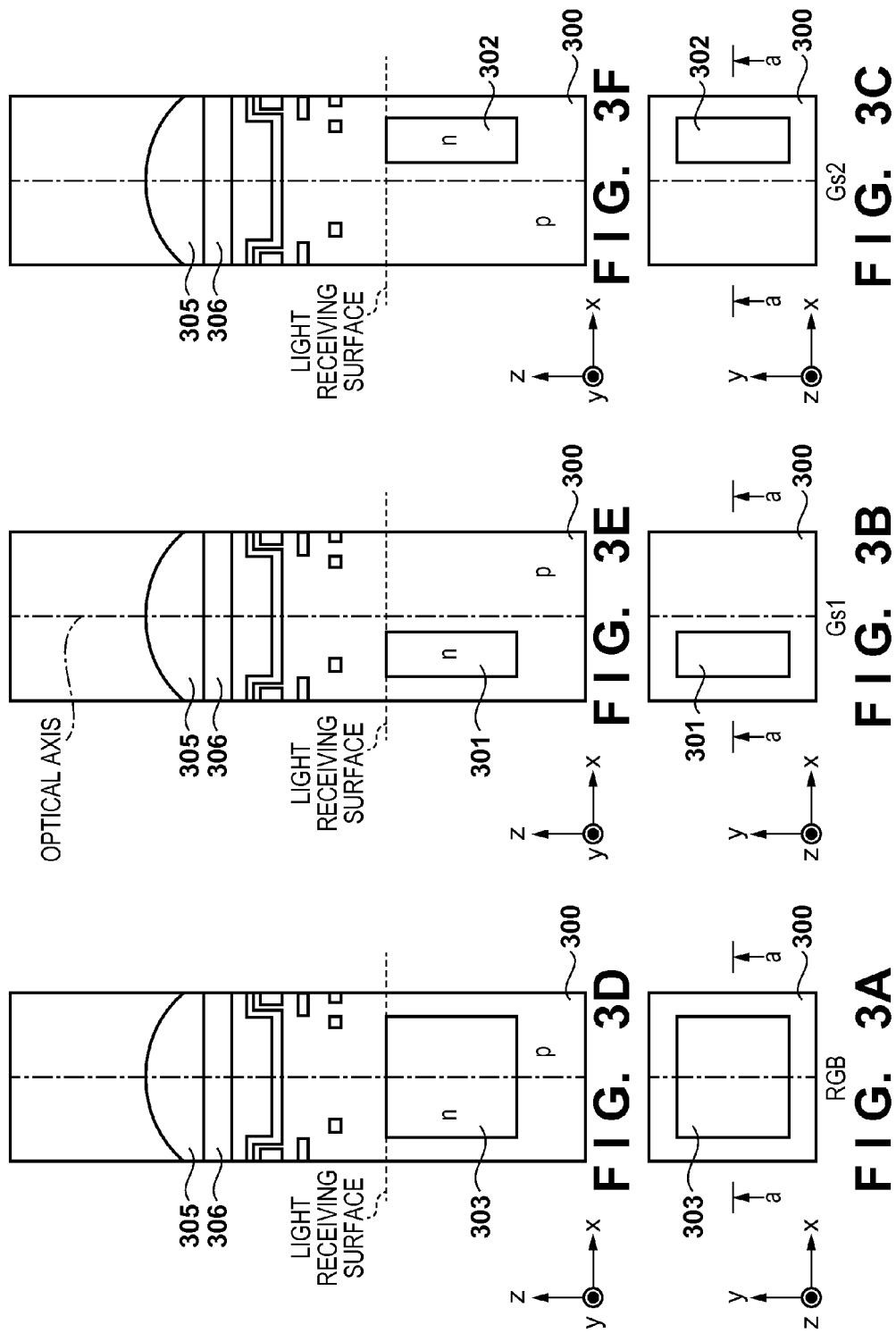

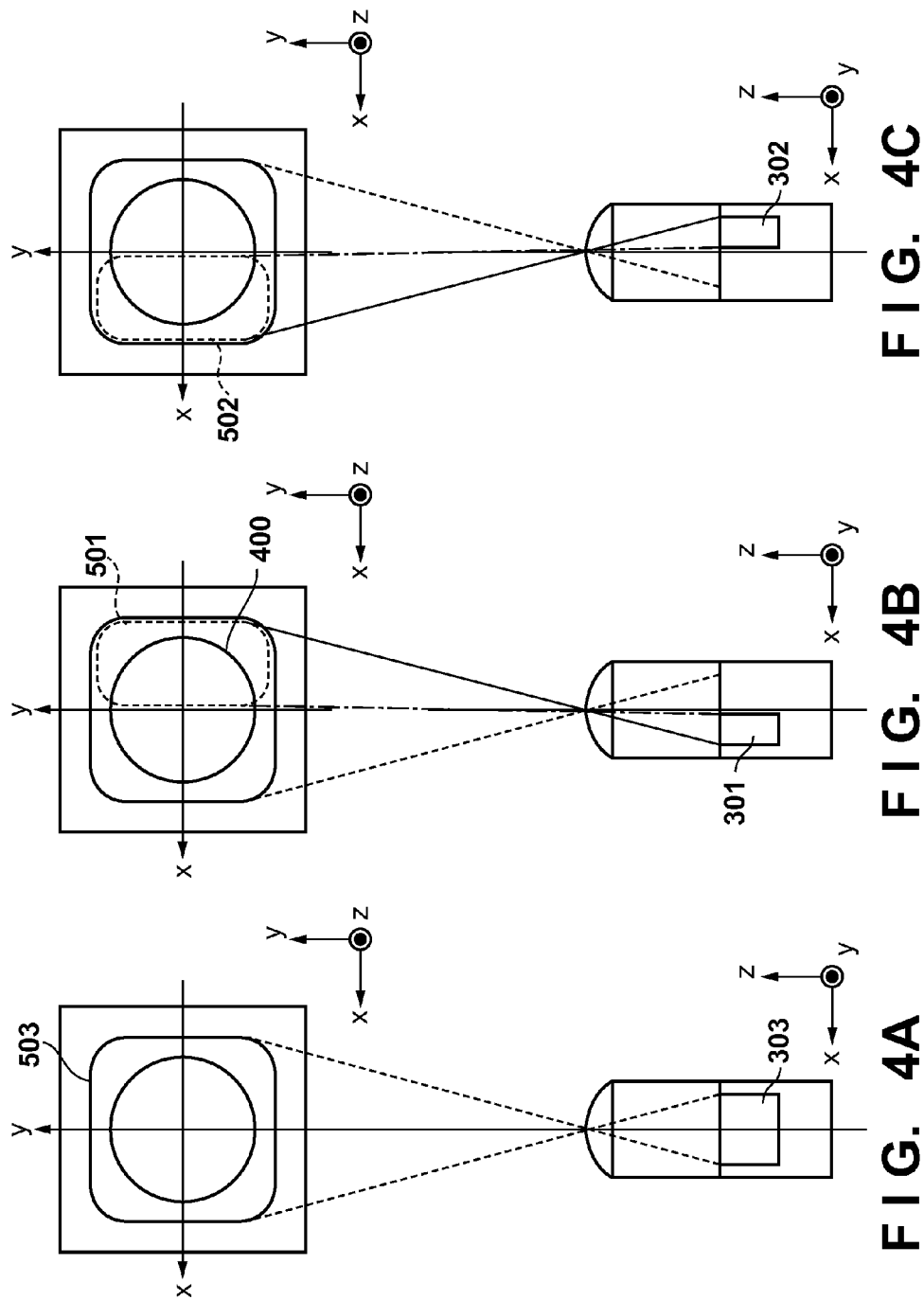

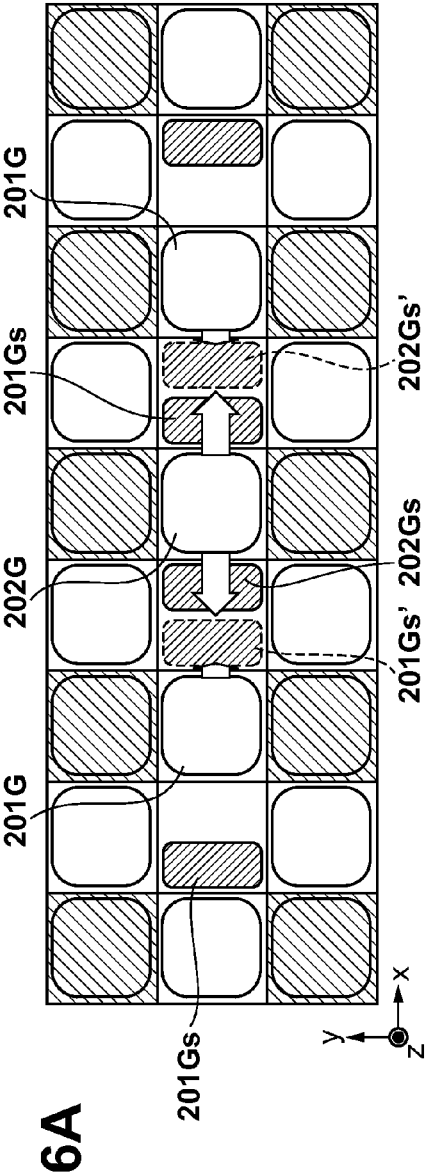
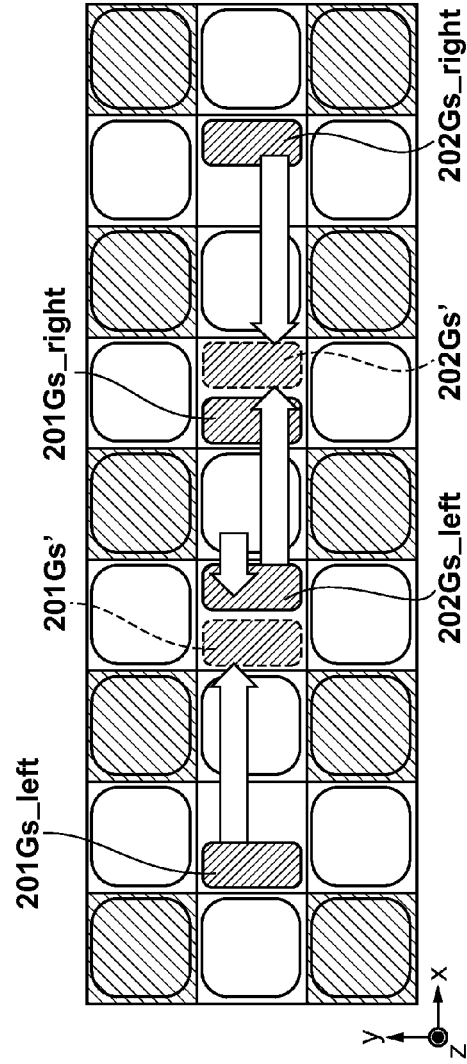
FIG. 6A
FIG. 6B

PIXEL ADDRESS

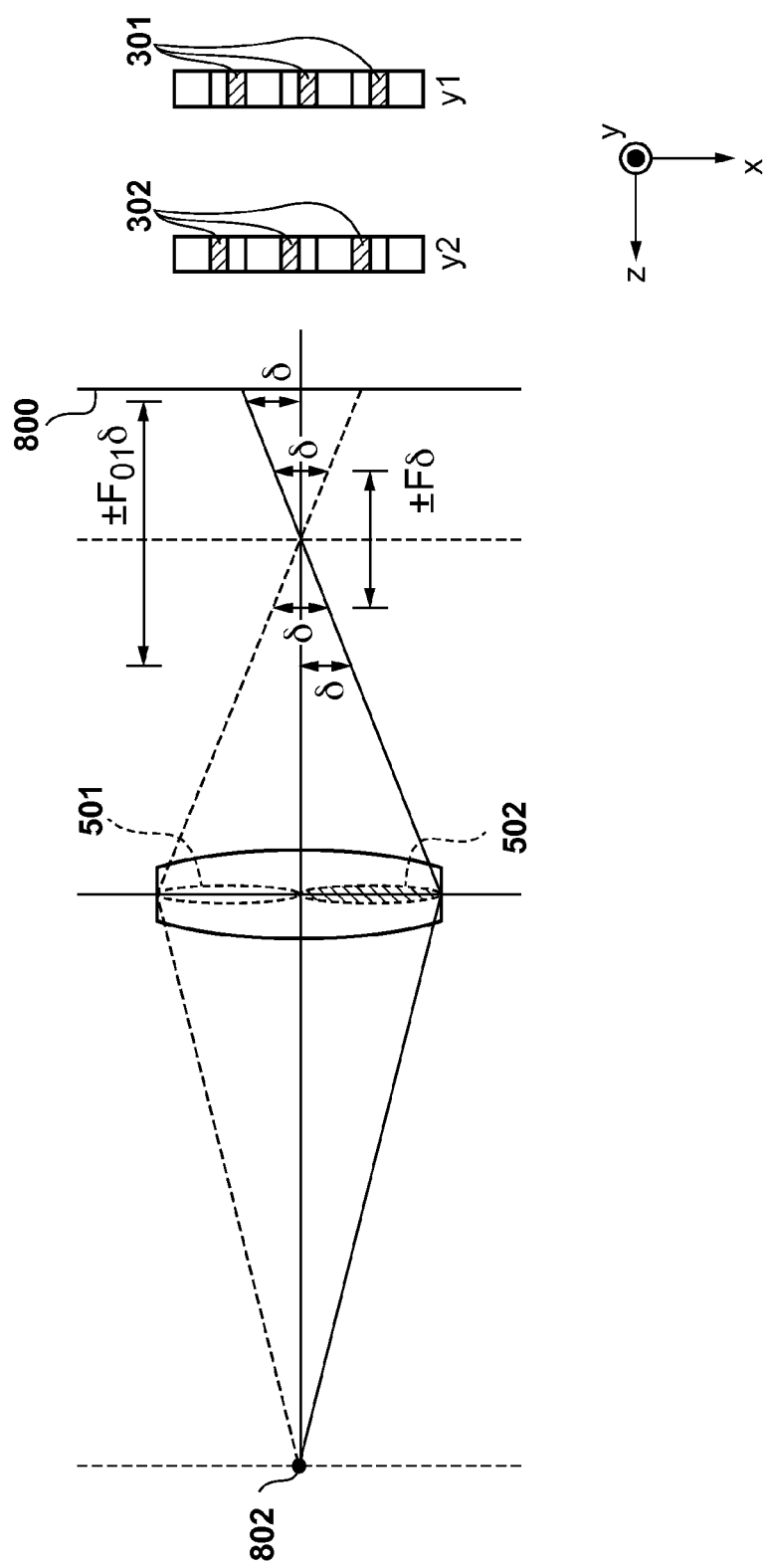

FOCUS DETECTION APPARATUS, CONTROL METHOD FOR THE SAME, AND IMAGE CAPTURE APPARATUS

BACKGROUND OF THE INVENTION

Field of the Invention

The present invention relates to a focus detection apparatus, a method for controlling the same, and an image capture apparatus.

Description of the Related Art

Two methods, namely a phase-difference detection method (phase-difference AF) and a contrast detection method (contrast AF), are widely used as methods for automatic focus detection (AF) for an image capture apparatus. Dedicated AF sensors have conventionally been used in phase-difference AF, but in recent years, similarly to contrast AF, phase-difference AF in which signals obtained from an image sensor are used has also been realized, and is referred to as image plane phase-difference AF, or the like.

The signals read out from the pixels in order to generate one pair of image signals to be used in image plane phase-difference AF correspond to light flux that is incident at a specified angle. There is known to be a technique in which, using this property, signals corresponding to different incidence angles are shifted and added together so as to generate image signals (refocus signals) in a virtual image capture plane, and thereby contrast AF based on the refocus signals is performed (Japanese Patent Laid-Open No. 2013-25246). Also, there are image sensors such as that described in Japanese Patent No. 3592147, in which focus detection pixels for generating a pair of image signals (A image, B image) to be used in image plane phase-difference AF are arranged discretely.

In the conventional technology, which includes the prior art documents, no consideration is given to performing contrast AF as with Japanese Patent Laid-Open No. 2013-25246 in an image capture apparatus using an image sensor in which focus detection pixels are arranged discretely, as in Japanese Patent No. 3592147.

The present invention has been made in view of the foregoing problem in the prior technology and provides a focus detection apparatus, a method for controlling the same, and an image capture apparatus, according to which it is possible to realize precise focus detection using an image sensor that has discretely-arranged focus detection pixels.

SUMMARY OF THE INVENTION

According to one aspect of the present invention, there is provided a focus detection apparatus comprising: an acquisition unit configured to acquiring signals of pixels from an image sensor in which a first pixel, a second pixels, and an imaging pixel are arranged, the first pixel receiving light flux that is restricted to light flux passing through a first portion of a pupil area of an imaging optical system, the second pixel receiving light flux that is restricted to light flux passing through a second portion that is different from the first portion of the pupil area, and the imaging pixel being different from the first and second pixels; an estimation unit configured to, based on the acquired signals, estimate a first estimated signal corresponding to the first pixel at a position at which the first pixel is not arranged, and a second estimated signal corresponding to the second pixel at a position at which the second pixel is not arranged; and a focus detection unit configured to calculate a defocus amount of the imaging optical system based on an estimated value obtained based on a first signal constituted by the first estimated signal and the signal from the first pixel, and a second signal constituted by the second estimated signal and the signal from the second pixel.

According to another aspect of the present invention, there is provided an image capture apparatus comprising: an image sensor in which a first pixel, and second pixel, and an imaging pixel are arranged, the first pixel receiving light flux that is restricted to light flux passing through a first portion of a pupil area of an imaging optical system, the second pixel receiving light flux that is restricted to light flux passing through a second portion that is different from the first portion of the pupil area, and the imaging pixel being different from the first and second pixels; a focus detection apparatus; and an adjustment unit configured to adjust a focal point of the imaging optical system based on the defocus amount detected by the focus detection apparatus, wherein the focus detection apparatus comprises: an acquisition unit configured to acquiring signals of pixels from an image sensor in which a first pixel, a second pixels, and an imaging pixel are arranged, the first pixel receiving light flux that is restricted to light flux passing through a first portion of a pupil area of an imaging optical system, the second pixel receiving light flux that is restricted to light flux passing through a second portion that is different from the first portion of the pupil area, and the imaging pixel being different from the first and second pixels; an estimation unit configured to, based on the acquired signals, estimate a first estimated signal corresponding to the first pixel at a position at which the first pixel is not arranged, and a second estimated signal corresponding to the second pixel at a position at which the second pixel is not arranged; and a focus detection unit configured to calculate a defocus amount of the imaging optical system based on an estimated value obtained based on a first signal constituted by the first estimated signal and the signal from the first pixel, and a second signal constituted by the second estimated signal and the signal from the second pixel.

According to still another aspect of the present invention, there is provided a method for controlling a focus detection apparatus, the method comprising: an acquisition step of acquiring signals of pixels from an image sensor in which a first pixel, a second pixel, and an imaging pixel are arranged, the first pixel receiving light flux that is restricted to light flux passing through a first portion of a pupil area of an imaging optical system, the second pixel receiving light flux that is restricted to light flux passing through a second portion that is different from the first portion of the pupil area, and the imaging pixel being different from the first and second pixels; an estimation step of, based on the acquired signals, estimating a first estimated signal corresponding to the first pixel at a position at which the first pixel is not arranged, and a second estimated signal corresponding to the second pixel at a position at which the second pixel is not arranged; and a focus detection step of calculating a defocus amount of the imaging optical system based on an estimated value obtained based on a first signal constituted by the first estimated signal and the signal from the first pixel, and a second signal constituted by the second estimated signal and the signal from the second pixel.

Further features of the present invention will become apparent from the following description of exemplary embodiments with reference to the attached drawings.

BRIEF DESCRIPTION OF THE DRAWINGS

FIGS. 3A to 3F are plan views and cross-sectional views schematically showing configurations of the imaging pixels shown in FIG. 2.

FIGS. 4A to 4C are schematic diagrams for describing a correspondence relationship between pixel structures shown in FIGS. 3A to 3F and pupil division.

FIGS. 6A and 6B are diagrams showing an example of a method for estimating a signal of a focus detection pixel according to an embodiment.

FIG. 14 is a diagram for describing a range in which refocusing is possible according to an embodiment.

DESCRIPTION OF THE EMBODIMENTS

Hereinafter, exemplary embodiments of the present invention will be described in detail with reference to the drawings.

Note that although the embodiments described below describe a configuration in which a focus detection apparatus according to the present invention is applied to a digital still camera, the focus detection apparatus according to the present invention can be applied to any device or apparatus having a camera function. Non-limiting examples of such devices and apparatuses include mobile phones, personal computers, tablet terminals, media players, game devices, navigation apparatuses, and household appliances.

In the present embodiment, a focus detection apparatus is considered in which focus detection using refocus signals such as those disclosed in Japanese Patent Laid-Open No. 2013-25246 is performed using signals from an image sensor such as that disclosed in Japanese Patent No. 3592147, in which focus detection pixels are arranged discretely. With an image sensor in which the focus detection pixels are arranged discretely, the pixel signals at the focus detection pixel positions need to be obtained by interpolation or correction using peripheral imaging pixels for normal image acquisition, and therefore having a lower density of focus detection pixels results in better quality in the recorded image. On the other hand, pixel signals corresponding to different partial pupil areas (viewpoints) are needed for detecting the defocus amount, and if the density of these pixels is low, the precision of focus detection will decrease.

In view of this, in the present embodiment, signals from pupil areas that are nearby the focus detection pixels and are different from the pupil areas of the focus detection pixels are estimated and the estimated focus detection signals are used to enable focus detection using the defocus amount with a density (resolution) that is higher than the arrangement density of the focus detection pixels.

First Embodiment
Overall Configuration

Figure 1:
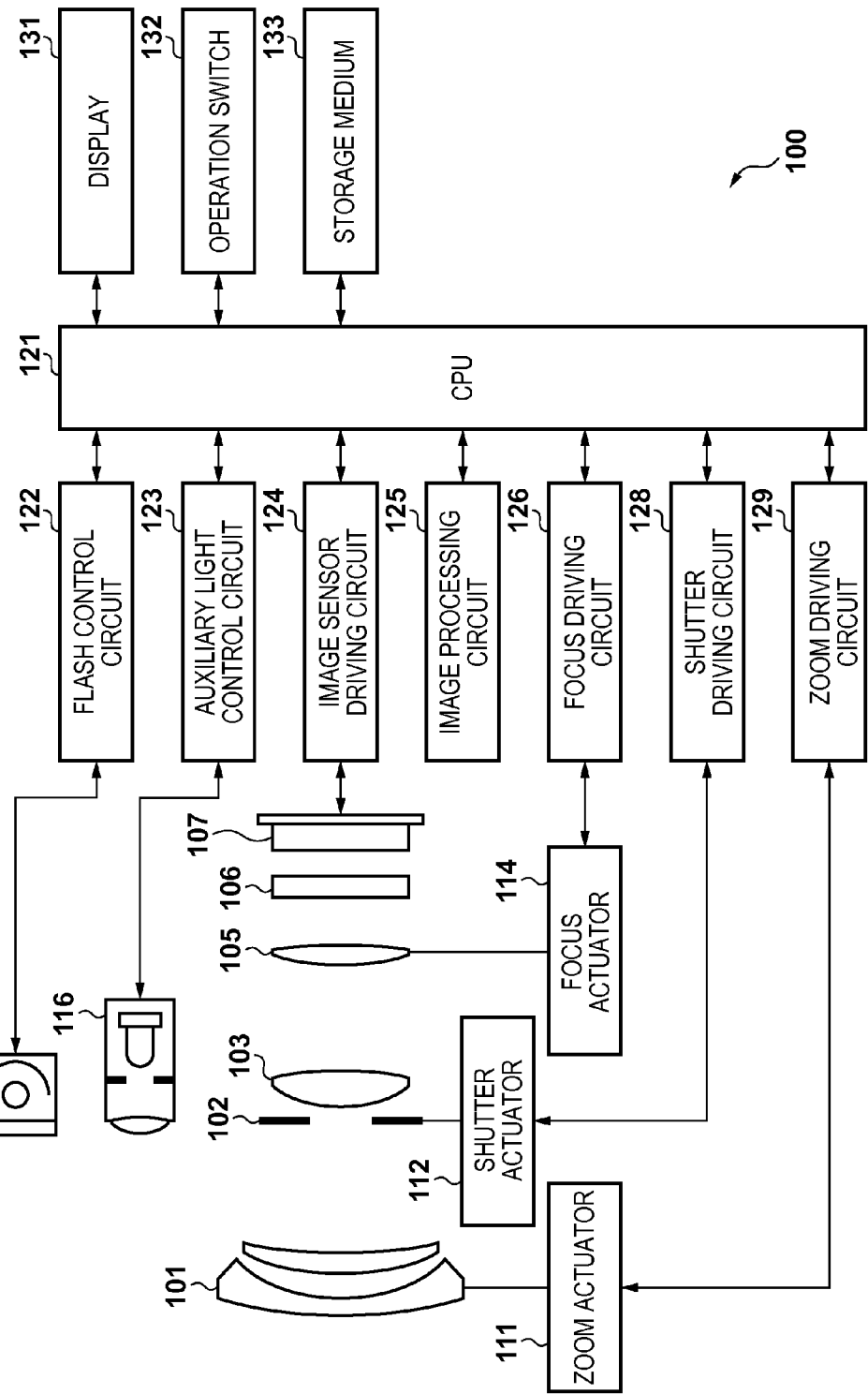
FIG. 1 is a diagram showing an example of a functional configuration of a digital still camera serving as an example of an image capture apparatus according to an embodiment of the present invention.

FIG. 1 is a diagram showing an example of a functional configuration of a digital still camera 100 (hereinafter to be referred to simply as "camera 100") according to the present embodiment.

A first lens group 101 is arranged at the leading end of a photographing optical system (imaging optical system) and is held such that it can move forward and rearward along an optical axis. A shutter 102 functions not only as a shutter for controlling exposure time during still image capture, but also as a diaphragm for performing light amount adjustment during image capture by adjusting an aperture diameter. A second lens group 103 arranged behind the shutter 102 (toward the image sensor side) can move forward and rearward along the optical axis together with the shutter 102 so as to realize a zoom function along with the first lens group 101.

A third lens group 105 is a focus lens that can move forward and rearward along the optical axis. An optical low-pass filter 106 is arranged in front of the image sensor 107 so as to reduce false color and moiré that occur in a captured image. The image sensor 107 is constituted by a two-dimensional CMOS image sensor and peripheral circuits thereof, and is arranged on an imaging plane of an imaging optical system. In the present embodiment, the image sensor 107 is a two-dimensional single-plane color image sensor in which m (>1) light receiving elements (pixels) in the horizontal direction and n (>1) light receiving elements in the vertical direction are arranged two-dimensionally and primary color mosaic filters in a Bayer arrangement are formed in the light receiving elements. The color filters restrict the wavelength of transmitted light incident on the light receiving element in units of pixels.

In accordance with control performed by a zoom driving circuit 129, a zoom actuator 111 realizes a zoom (magnification) function by pivoting a cam cylinder (not shown) and driving at least one of the first lens group 101 and the third lens group 105 along the optical axis. In accordance with control performed by a shutter driving circuit 128, a shutter actuator 112 adjusts the amount of light for image capture by controlling an aperture diameter of a shutter 102, and controls exposure time during still image capture. In accordance with control performed by a focus driving circuit 126, a focus actuator 114 drives the third lens group 105 along the optical axis.

A flash 115 is preferably a flash illumination device using a xenon tube, but it may be an illumination device including an LED that performs continuous light emission. An AF auxiliary light output unit 116 projects a mask image with a predetermined aperture pattern on the subject field via a projecting lens so as to improve focus detection capabilities with respect to low-luminance subjects and low-contrast subjects.

The CPU 121 performs overall control of operations of the camera 100 and includes a calculation unit, ROM, RAM, A/D converter, D/A converter, communication interface circuit, and the like (not shown). The CPU 121 executes a program stored in the ROM so as to control various circuits included in the camera 100 and realize functions of the camera 100, such as AF, AE, image processing, and storage.

A flash control circuit 122 performs lighting control on the flash 115 in synchronization with an image capturing operation. An auxiliary light control circuit 123 performs lighting control on the AF auxiliary light output unit 116 during a focus detection operation. The image sensor driving circuit 124 controls operations of the image sensor 107, performs A/D conversion on image signals read out from the image sensor 107, and thereafter outputs them to the CPU 121. An image processing circuit 125 applies image processing such as gamma conversion, color interpolation, and JPEG encoding to image signals.

A focus driving circuit 126 drives the focus actuator 114 based on a focus detection result so as to move the third lens group 105 along the optical axis and thus perform focus adjustment. A shutter driving circuit 128 drives the shutter actuator 112 so as to control the aperture diameter and opening/closing timing of the shutter 102. A zoom driving circuit 129 drives the zoom actuator 111 in response to a zoom operation input by a photographer with a press of a zoom operation switch included in an operation switch 132, for example.

A display 131 is an LCD or the like that displays information regarding the image capture mode of the camera 100, preview images before shooting, images for confirmation after shooting, information on the in-focus state during focus detection, and the like. The operation switch 132 includes a power switch, a release (image capture trigger) switch, a zoom operation switch, an image capture mode selection switch, and the like. A storage medium 133 is, for example, a detachable semiconductor memory card that stores captured images.

Image Sensor

Figure 2:
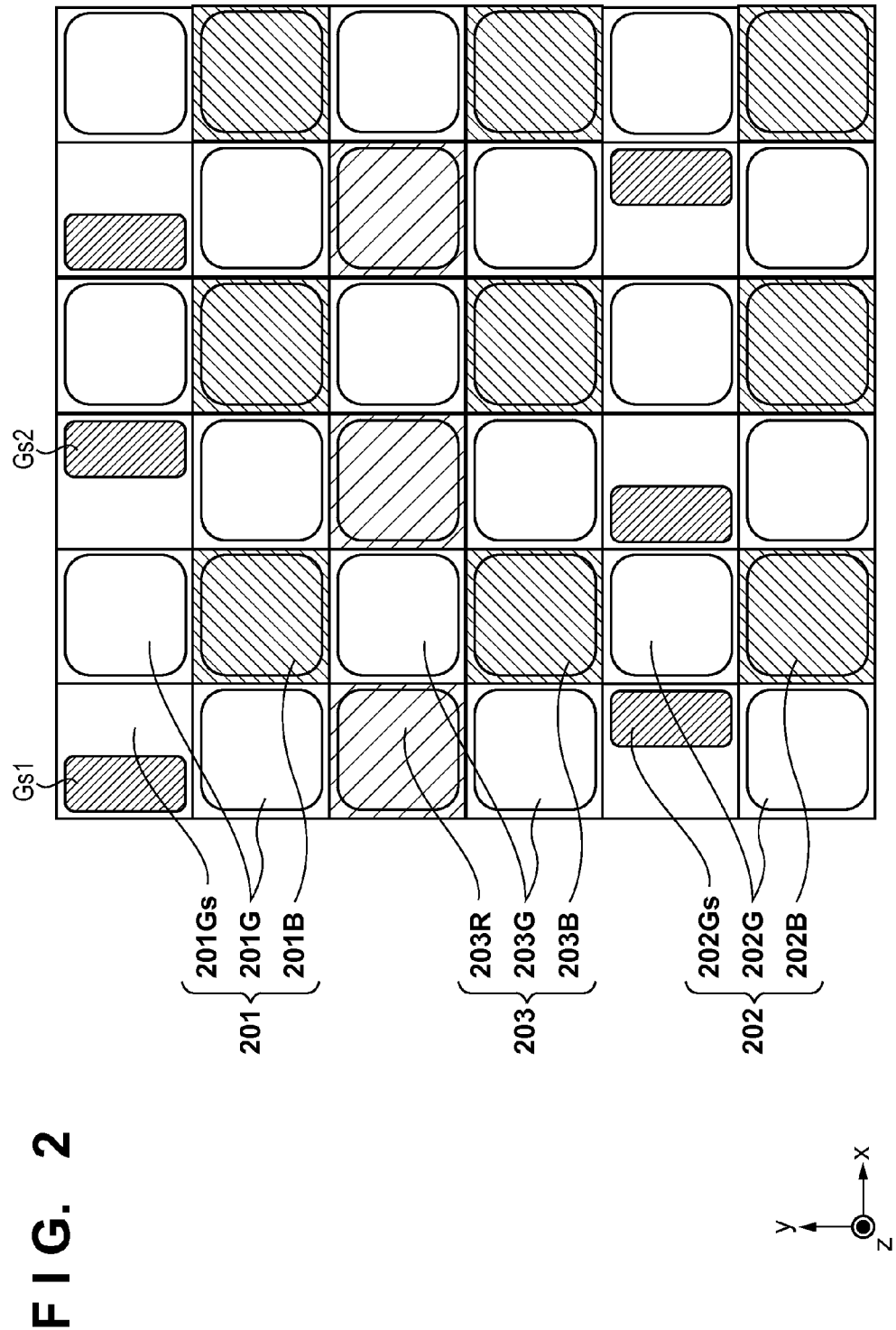
FIG. 2 is a diagram schematically showing an example of an arrangement of imaging pixels and focus detection pixels in the image sensor 107 shown in FIG. 1.

FIG. 2 is a diagram schematically showing an example of an arrangement of imaging pixels and focus detection pixels in the image sensor 107, and representatively shows a 6×6-pixel region. In the present embodiment, a 2×2 pixel group 201 in the upper left portion of FIG. 2 corresponds to a repeating unit of color filters in a primary-color Bayer arrangement provided in the image sensor 107. Note that a focus detection pixel 201Gs with a G (green) spectral sensitivity is arranged at the upper left R (red) position, imaging pixels 201G with a G (green) spectral sensitivity are arranged in the upper right and lower left, and an imaging pixel 201B with a B (blue) spectral sensitivity is arranged in the lower right. The focus detection pixel 201Gs is a first focus detection pixel having a light receiving portion (photoelectric conversion portion) Gs1 biased (deviating) leftward of the center of the pixel (optical axis of corresponding microlens) in the horizontal direction.

Also, a 2×2 pixel group 202 differs from the pixel group 201 in that the focus detection pixel 202Gs arranged in the upper left portion is a second focus detection pixel having a light receiving portion Gs2 biased in the direction opposite to that of the light receiving portion Gs1 of the first focus detection pixel in the horizontal direction. The imaging pixels 202G and 202B are the same as the imaging pixels 201G and 201B.

In the present embodiment, the focus detection pixels 201Gs and 202Gs have G (green) spectral sensitivity (have green color filters), but as long as they both have the same spectral sensitivity, the color filters may be another color (including transparent), or it is possible to not include the color filters.

No focus detection pixels are arranged in a pixel group 203 between the pixel groups 201 and 202. Accordingly, an imaging pixel 203R with an R (red) spectral sensitivity is arranged in the upper left, imaging pixels 203G with G (green) spectral sensitivity are arranged in the upper right and lower left, and an imaging pixel 203B with B (blue) spectral sensitivity is arranged in the lower right.

The image sensor 107 according to the present embodiment has a configuration in which the pixel groups 201 to 203 are arranged in combination. In the example shown in FIG. 2, the pixel groups 201 and 202 are arranged alternatingly in the horizontal direction in the top two rows, only the pixel group 203 is arranged in the horizontal direction in the next two rows, and the pixel groups 202 and 201 are arranged alternatingly in the horizontal direction in the bottom two rows.

FIGS. 3A to 3C show plan views of one imaging pixel, a first focus detection pixel, and a second focus detection pixel shown in FIG. 2, in a view from a light receiving surface side (+z side) of the image sensor 107, and FIGS. 3D to 3F show cross-sectional views taken along line a-a in FIGS. 3A to 3C, in a view from a −y side.

As shown in FIGS. 3D to 3F, it is preferable that the imaging pixel, the first focus detection pixel, and the second focus detection pixel have similar configurations, excluding the area and arrangement of the light receiving portions. That is to say, a microlens 305 for gathering incident light, a color filter 306 that restricts the wavelength of incident light, and a photoelectric conversion portion 303 (301, 302) that generates a charge corresponding to the amount of incident light are formed in each pixel. Note that as described above, the color filter 306 of the focus detection pixel may be omitted, or it may be given a spectral transmissivity different from that of the green-colored color filter.

As shown in FIG. 3B and FIG. 3E, with the first focus detection pixel Gs1, a photoelectric conversion portion 301 biased in the −x direction with respect to the center of the pixel is formed. Also, as shown in FIG. 3C and FIG. 3F, with the second focus detection pixel Gs2, a photoelectric conversion portion 302 biased in the x direction with respect to the center of the pixel is formed. Also, as shown in FIG. 3A and FIG. 3D, with an imaging pixel R/G/B, a photoelectric conversion portion 303 that is symmetrical with respect to the center of the pixel is formed.

In the present embodiment, the photoelectric conversion portion 301 of the first focus detection pixel Gs1 and the photoelectric conversion portion 302 of the second focus detection pixel Gs2 are described as having about half the area of the photoelectric conversion portion 303 of the imaging pixel R/G/B. However, the focus detection pixels may be constituted by multiple pixels having multiple photoelectric conversion portions with even smaller areas.

Light incident on the pixels is condensed by the microlenses 305 and filtered by the color filters 306, whereafter it is received by the photoelectric conversion portions 301 to 303. With the photoelectric conversion portions 301 to 303, electrons and holes are created in pairs according to the amount of received light and separated by a depletion layer, and thereafter, the negatively-charged electrons are accumulated in an n-type layer and the holes are discharged to the outside of the image sensor 107 through a p-type layer 300 that is connected to a constant voltage source (not shown). The electrons accumulated in the n-type layer of the photoelectric conversion portions 301 to 303 are transferred to an electrostatic capacitor (FD) via a transfer gate and converted into a voltage signal.

FIGS. 4A to 4C show diagrams for describing an overall correspondence relationship between the pixel structures of the present embodiment shown in FIGS. 3A to 3F and pupil division. With FIGS. 4A to 4C, in order to obtain correspondence with a coordinate axis on the exit pupil plane, the x axis and y axis of the cross-sectional views are reversed in FIGS. 3A to 3F.

In FIG. 4A, the pupil area 503 of an imaging pixel R, G, or B is approximately conjugate with the light receiving surface of the photoelectric conversion portion 303 due to the microlens 305, and represents a pupil area that enables an imaging pixel R, G, or B to receive light.

In FIG. 4B, due to the microlens 305, a first portion 501 of the first focus detection pixel Gs1 is approximately conjugate with the light receiving surface of the photoelectric conversion portion 301, whose centroid deviates in the +x direction, and represents a pupil area that enables a first focus detection pixel Gs1 to receive light. The first portion 501 for the first focus detection pixel Gs1 has a centroid that deviates toward the −x side on the pupil plane.

In FIG. 4C, due to the microlens 305, a second portion 502 of the second focus detection pixel Gs2 is approximately conjugate with the light receiving surface of the photoelectric conversion portion 302, whose centroid deviates in the −x direction, and represents a pupil area that enables a second focus detection pixel Gs2 to receive light. The second portion 502 for the second focus detection pixel Gs2 has a centroid that deviates toward the +x side on the pupil plane.

Figure 5A:
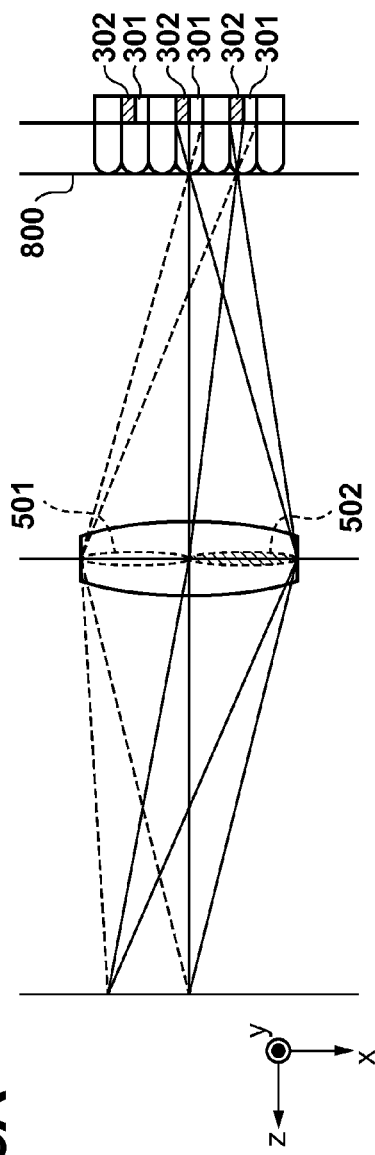
FIG. 5A is a diagram showing a correspondence relationship between the image sensor of the present embodiment and pupil division.

FIG. 5A shows a schematic diagram showing a correspondence relationship between a first focus detection pixel Gs1, which is a focus detection pixel according to the present invention, and pupil division. Light flux that has passed through the first portion 501 is incident at different angles on the pixels of the image sensor, and is received by the first focus detection pixels Gs1. Note that in the present embodiment, the pupil area is divided in the horizontal direction by the first focus detection pixels Gs1 and the second focus detection pixels Gs2, but pupil division may be performed in the vertical direction as needed.

Thus, in the image sensor 107 of the present embodiment,
a first focus detection pixel that receives light flux that is restricted to light flux passing through the first portion 501 of the pupil area of the imaging optical system,
a second focus detection pixel that receives light flux that is restricted to light flux passing through the second portion 502 that is different from the first portion of the pupil area of the imaging optical system, and
an imaging pixel that is different from the first and second focus detection pixels and does not restrict the received light flux (receives light flux passing through the entire pupil area of the imaging optical system)
are arranged. Here, with the imaging pixels, the pupil area may be set independently from the first and second focus detection pixels, and there is no particular limitation on how much of the light flux from the pupil area of the imaging optical system is received.

In the present embodiment, the CPU 121 performs focus detection by generating a first focus signal from signals obtained using multiple first focus detection pixels Gs1 and generating a second focus signal from signals obtained from multiple second focus detection pixels Gs2. At this time, as described above, interpolation calculation using the signals obtained from the imaging pixels R, G, and B, which are imaging pixels, and signals obtained from the first focus detection pixels Gs1 and the second focus detection pixels Gs2 is performed and the number of signals for forming a focus signal is increased, thereby improving the precision of focus detection.

Relationship Between Defocus Amount and Image Shift Amount

Hereinafter, a relationship between a defocus amount and an image shift amount of the first focus detection signal and the second focus detection signal obtained by the image sensor of the present embodiment will be described.

Figure 5B:
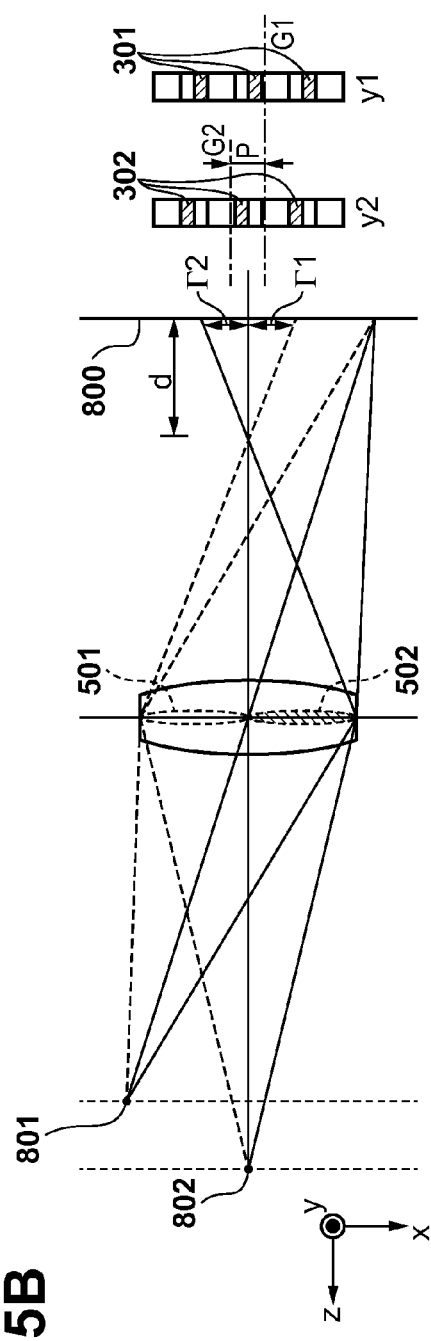
FIG. 5B is a diagram showing a relationship between a defocus amount and an image shift amount between a first focus detection signal and a second focus detection signal according to an embodiment.

FIG. 5B shows a diagram of an overall relationship between the defocus amount and the image shift amount between the first focus detection signal and the second focus detection signal. An image sensor (not shown) is arranged on the image capture plane 800, and similarly to FIGS. 4A to 4C and 5A, the exit pupil of the imaging optical system is divided into two portions, namely the first portion 501 and the second portion 502.

Also, the photoelectric conversion portions 301 of the first focus detection pixels Gs1 receive light from the first portion 501, and the photoelectric conversion portions 302 of the second focus detection pixels Gs2 receive light from the second portion 502. FIG. 5B shows a pixel row y1 that includes first focus detection pixels Gs1 of the image sensor and a pixel row y2 that includes second focus detection pixels Gs2.

The size |d| of the defocus amount d is the distance from the image forming position of a subject to the image capture plane 800. Also, if the defocus amount d is negative (d<0), it means a front-focused state in which the image forming position of the subject is closer to the subject side than the image capture plane 800 is, and if it is positive (d>0), it means a rear-focused state in which the image forming position of the subject is farther from the subject side than the image capture plane 800 is. Also, in an in-focus state in which the image forming position of the subject is in the image capture plane 800, the size of the defocus amount d is 0. FIG. 5B shows an example in which a subject 801 is in focus (d=0) and a subject 802 is in a front-focused state (d<0). The front-focused state (d<0) and the rear-focused state (d>0) are collectively referred to as a defocus state (|d|>0).

In the front-focused state (d<0), the portion of the light flux from the subject 802 that has passed through the first portion 501 (second portion 502) is condensed once at a position that is more toward the subject side than the image capture plane 800 is. Then, thereafter, the light flux spreads out to a width Γ1 (Γ2) centered about the centroid position G1 (G2) of the light flux, resulting in a blurred image in the image capture plane 800. The blurred image is converted into an electric signal by the photoelectric conversion portions 301 of the first focus detection pixels Gs1 (photoelectric conversion portions 302 of the second focus detection pixels Gs2) in multiple pixels on which the light flux is incident. Also, the first focus detection signal (second focus detection signal) is generated by the CPU 121 from the signals of a group of first focus detection pixels Gs1 (group of second focus detection pixels Gs2). Accordingly, the first focus detection signal (second focus detection signal) is stored as a subject image in which the subject 802 is blurred to a width Γ1 (Γ2) at a centroid position G1 (G2) on the image capture plane 800.

The blur width Γ1 (Γ2) of the subject image increases approximately in proportion with an increase in the size |d| of the defocus amount d. Similarly, the size |p| of a subject image shift amount p (=difference between centroid positions of light flux, i.e. G1–G2) between the first focus detection signal and the second focus detection signal also increases approximately in proportion with an increase in the size |d| of the defocus amount d. In the case of the rear-focused state (d>0), the relationship between the size |d| of the defocus amount and the blur width of the subject image and the relationship between the size |d| of the defocus amount and the image shift amount p are similar except that the subject image shift direction between the first focus detection signal and the second focus detection signal is opposite to that in the front-focused state.

Focus Detection

In the present embodiment, the relationship between the defocus amount and the image shift amount between the first focus detection signal and the second focus detection signal is used to perform focus detection based on a refocusing principle (hereinafter referred to as a refocus method). Also, focus detection by means of a phase-difference method is performed in which the relationship between the defocus amount and the image shift amount between the first focus detection signal and the second focus detection signal are used.

The result of focus detection by means of the phase-difference method is used to perform focus adjustment from a large defocus state to a small defocus state, and focus detection by means of the refocus method is performed to perform focus adjustment from a small defocus state to nearby an optimal in-focus position.

Signal Estimation for Focus Detection Pixels

In the present embodiment, signals of the second focus detection pixels Gs2 that correspond to pixel positions at which the first focus detection pixels Gs1 are arranged (pixel positions at which the second focus detection pixels Gs2 are not arranged) are estimated. Also, signals of the first focus detection pixels Gs1 that correspond to pixel positions at which the second focus detection pixels Gs2 are arranged (pixel positions at which the first focus detection pixels Gs1 are not arranged) are estimated. Accordingly, since the number of signals constituting the focus detection signals can be seemingly increased, the precision of focus detection can be raised. In other words, the number of focus detection pixels needed for realizing a predetermined number of signals, that is, the number of pixel positions at which interpolation is needed, can be reduced, and therefore a reduction in image quality in a shot image can be suppressed.

Also, by using output signals of first focus detection pixels Gs1 and second focus detection pixels Gs2 that correspond to the same pixel position, it is also possible to suppress a decrease in the precision of focus detection caused by the positions of the first focus detection pixels Gs1 and the second focus detection pixels Gs2 being different.

Furthermore, as will be described later, the precision of contrast AF based on a refocus signal generated using the focus detection signals can also be improved.

The signals of the first focus detection pixels Gs1 that correspond to the positions of the second focus detection pixels Gs2 can be obtained (estimated) by obtaining the signals of the imaging pixels corresponding to those positions using interpolation, and thereafter subtracting the signals of the second focus detection pixels therefrom. The signals of the second focus detection pixels Gs2 corresponding to the positions of the first focus detection pixels Gs1 are also obtained by subtracting the signals of the first focus detection pixels Gs1 from the signals of the imaging pixels corresponding to the positions of the first focus detection pixels Gs1. This is based on the fact that the size of the photoelectric conversion portions of the first focus detection pixel Gs1 and the second focus detection pixel Gs2 is half of that of the photoelectric conversion portion of the imaging pixel in the present embodiment.

FIGS. 6A and 6B schematically show a procedure for generating the output signals of the focus detection pixels using peripheral pixel information, according to the present method. Here, a configuration such as that shown in FIG. 2 is shown, in which the first focus detection pixels Gs1 and the second focus detection pixels Gs2 are arranged in four-pixel cycles in the pupil division direction. In FIG. 6A, the signals of the first focus detection pixel 201Gs' and the second focus detection pixel 202Gs' can be obtained as indicated in the following equations, using the signals of the second focus detection pixels 201G and 202G that are adjacent to the respective pixels in the pupil division direction.

$$202Gs' = \frac{201G + 202G}{2} - 201Gs \quad (1)$$

$$201Gs' = \frac{201G + 202G}{2} - 202Gs \quad (2)$$

As shown in FIG. 6B, a method of using information of adjacent focus detection pixels of the same type is considered as another method for estimating the signals of the first (second) focus detection pixels. In other words, the signals of the first focus detection pixels 201Gs' corresponding to the positions of the second focus detection pixels 202Gs are obtained by interpolating the signals of two first focus detection pixels 201Gs_left and 201Gs_right that are adjacent in the pupil division direction. Also, the signals of the second focus detection pixels 202Gs' corresponding to the positions of the first focus detection pixels 201Gs are obtained by interpolating the signals of two second focus detection pixels 202Gs_left and 202Gs_right that are adjacent in the pupil division direction. Calculation formulas for the case where the interpolation method uses the average value of adjacent focus detection values of the same type are shown below.

$$202Gs' = \frac{202Gs2\_left + 202Gs2\_right}{2} \quad (3)$$

$$201Gs' = \frac{201Gs1\_left + 201Gs\_right}{2} \quad (4)$$

Note that a method for estimating the signals of the focus detection pixels other than that described here, such as bicubic interpolation, may be used.

First Focus Detection (Image Plane Phase-Difference Detection Method)

Hereinafter, an image plane phase-difference AF according to the present embodiment will be described.

With the image plane phase-difference AF of the present embodiment, the first focus detection signals and the second focus detection signals are shifted relative to one another to calculate a correlation amount, which is an evaluation value indicating the degree of coincidence between the signals, and the image shift amount is detected based on the shift amount at which the correlation (degree of coincidence between the signals) is high. The image shift amount is converted into the defocus amount based on a relationship in which the image shift amount between the first focus detection signal and the second focus detection signal increases when the defocus amount of the imaging signals increases.

Figure 7A:
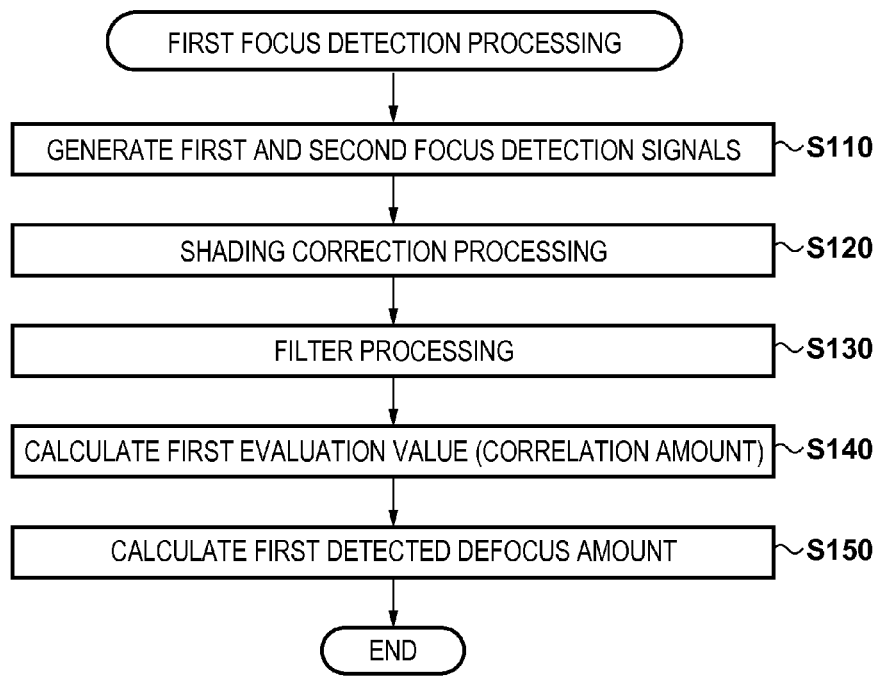
FIGS. 7A and 7B are flowcharts for first focus detection and second focus detection according to an embodiment.

FIG. 7A is a flowchart for illustrating defocus amount calculation processing according to the present embodiment.

In step S110, the CPU 121 sets a focus detection region in an effective pixel region of the image sensor 107. There is no particular limitation to the size or location of the focus detection region, and it may be fixed or determined dynamically. Here, it is assumed that the focus detection region is rectangular in shape. Then, the CPU 121 sets a range W in the pupil division direction (the horizontal direction of the image sensor 107 in the present embodiment) in the focus detection region, and a shift range Γ1 for first shift amounts s1 for when the first focus detection signal and the second focus detection signal are shifted in the pupil division direction relative to one another to calculate the correlation amount.

The CPU 121 reads out signals from multiple pixels included in the region associated with the focus detection region (AF frame) via the image sensor driving circuit 124. Note that the region in which pixels are read out in order to generate focus detection signals is usually larger in the pupil division direction than the focus detection region is. Among the read-out signals, the CPU 121 generates a first focus detection signal from the multiple signals obtained from the first focus detection pixels, and generates a second focus detection signal from the multiple signals obtained from the second focus detection pixels.

In step S120, the CPU 121 performs shading correction processing (optical correction processing) on the first focus detection signal and the second focus detection signal resulting from pixel addition processing.

Figure 8C:
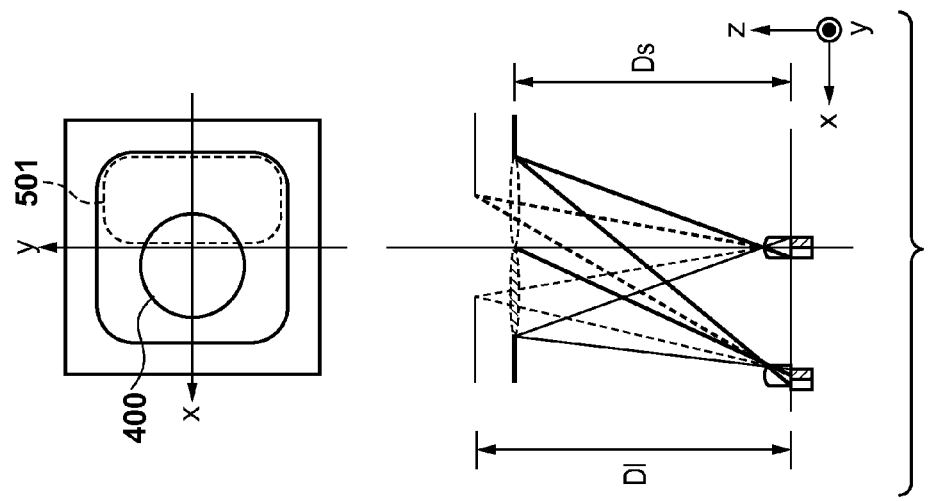
FIGS. 8A to 8C are diagrams for describing shading correction in first focus detection according to an embodiment.
Figure 8B:
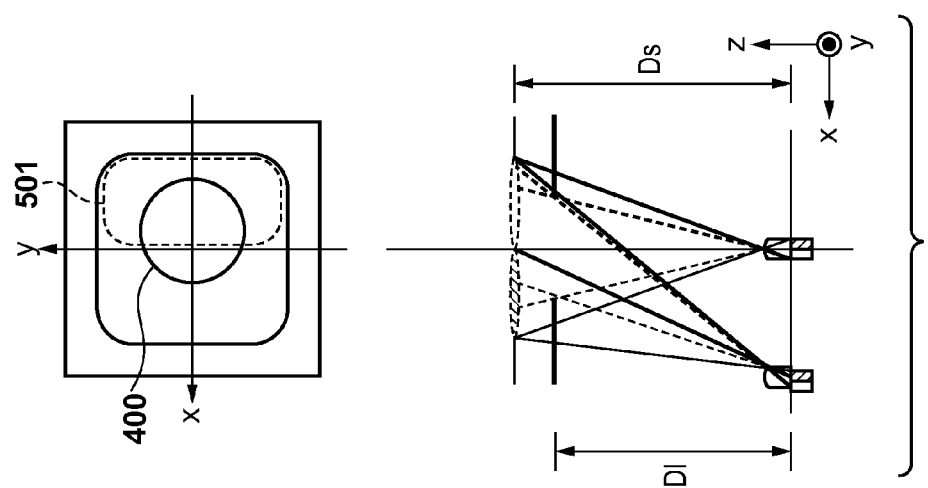
Figure 8A:
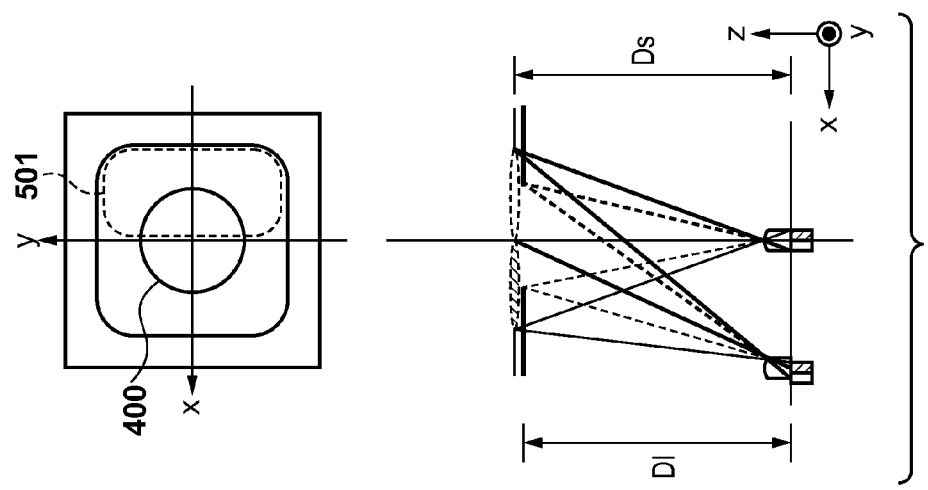

Here, shading caused by pupil misalignment between the first focus detection signal and the second focus detection signal will be described. FIGS. 8A to 8C are diagrams schematically showing the influence of a difference between an exit pupil distance D1 of an imaging optical system and a set pupil distance Ds of an image sensor on pupil division in a pixel with a large image height (a pixel located away from the optical axis).

FIG. 8A shows a case in which the exit pupil distance D1 of the imaging optical system and the set pupil distance Ds of the image sensor 107 are the same. In this case, the exit pupil 400 of the imaging optical system is divided approximately in half by the first portion 501 in both a pixel with a small image height (a pixel located near the optical axis) and a pixel with a large image height (a pixel located away from the optical axis).

FIG. 8B shows a case in which the exit pupil distance D1 of the imaging optical system is shorter than the set pupil distance Ds of the image sensor (D1<Ds). In this case, in peripherally-located pixels whose image heights are large, the exit pupil 400 of the imaging optical system and the entrance pupil of the image sensor 107 are misaligned, and the exit pupil 400 of the imaging optical system is unevenly divided as shown in the cross-sectional view.

FIG. 8C shows a case in which the exit pupil distance D1 of the imaging optical system is longer than the set pupil distance Ds of the image sensor (D1>Ds). In this case as well, similarly to the case where D1<Ds, in pixels on peripheral portions of the image sensor, the exit pupil 400 of the imaging optical system and the entrance pupil of the image sensor 107 become misaligned, which results in the exit pupil 400 of the imaging optical system being divided unevenly.

When the pupil division is uneven, a difference occurs in the signal intensities of the first focus detection pixels and the second focus detection pixels, resulting in shading which causes the intensities of the first focus detection signal and the second focus detection signal to be uneven (one intensity is larger and the other intensity is smaller).

In step S120, the CPU 121 generates a first shading correction coefficient for the first focus detection signal and a second shading correction coefficient for the second focus detection signal according to the image height of the focus detection region, the diaphragm value (F value) of the imaging lens (imaging optical system), and the exit pupil distance. Then, the CPU 121 performs shading correction processing (optical correction processing) on the first focus detection signal and the second focus detection signal by multiplying the first focus detection signal by the first shading correction coefficient and multiplying the second focus detection signal by the second shading correction coefficient. The image height of the focus detection region may be a representative image height for a pixel position included in the focus detection region, or it may be an image height at a central position in the focus detection region, for example.

When the defocus amount is calculated based on the correlation between the first focus detection signal and the second focus detection signal (degree of coincidence between the signals), there are cases where the precision of the defocus amount decreases when the above-described shading appears. For this reason, in the present embodiment, precise calculation of the defocus amount is realized by performing shading correction on the focus detection signals.

Note that a case in which the set pupil distance Ds of the image sensor 107 does not change and the exit pupil distance D1 of the imaging optical system changes has been described as a cause of shading, but a case in which the exit pupil distance D1 of the imaging optical system does not change and the set pupil distance Ds of the image sensor 107 changes will also have similar results. With image plane phase-difference AF, the light flux received by the focus detection pixels (first focus detection pixels and second focus detection pixels) and the light flux received by the imaging pixels change accompanying a change in the set pupil distance Ds of the image sensor 107.

In step S130 of FIG. 7A, in order to calculate a precise defocus amount, the CPU 121 increases the degree of coincidence between the signals by performing band pass filter processing including a specific pass frequency band on the first focus detection signal and second focus detection signal. The solid line in FIG. 9 indicates an example of a pass band in the filter processing. In the present embodiment, with first focus detection using a phase-difference detection method, the pass band in the filter processing is configured to include a low-frequency band in order to perform focus detection in a large defocus state. When performing focus adjustment from a large defocus state to a small defocus state, the pass band in the filter processing during the first focus detection may be adjusted as needed to a higher frequency band, as indicated by the one-point chain line in FIG. 9.

Note that if processing for estimating focus detection pixels is to be performed, the signals of the first and second focus detection pixels are read out in step S110, and the estimation processing can be carried out at any time before the start of the evaluation value calculation in step S140.

Note that carrying out the estimation processing for the focus detection pixels in the first focus detection is not mandatory.

Next, in step S140 of FIG. 7A, the CPU 121 performs shift processing for shifting the first focus detection signal and the second focus detection signal resulting from the filter processing relative to each other in the pupil division direction so as to calculate a first evaluation value (correlation amount) indicating a degree of coincidence between the signals.

Let Gs1(k) and Gs2(k) respectively be the k-th samples of the first and second focus detection signals resulting from the filter processing, and let W be range of numbers k corresponding to the focus detection region. Accordingly, the numbers k range from 1 to W. Letting Γ1 be the shifting range for first shift amounts s1, the correlation amount COR is calculated according to the following equation (5).

$$COR(s_1) = \sum_{k \in W} |Gs1(k) - Gs2(k - s_1)|, s_1 \in \Gamma 1 \quad (5)$$

According to shift processing by the first shift amounts s1, a shift subtraction signal is generated by subtracting the (k−s1)-th sample Gs2(k−s1) of the second focus detection signal from the k-th sample Gs1(k) of the first focus detection signal. Then, the CPU 121 calculates the absolute value of the generated shift subtraction signal and accumulates them while successively changing the value of k within the range W corresponding to the focus detection region so as to calculate the correlation value COR(s1) corresponding to the shift amount s. The correlation amount COR(s1) may be calculated as needed by adding the correlation amounts calculated in each pixel line in which focus detection pixels are arranged to each first shift amount s1, within the focus detection range.

In step S150, based on the correlation amount COR(s1), the CPU 121 uses sub-pixel calculation to calculate a shift amount of an actual value at which the correlation amount is the minimum value and sets it as the image shift amount p1. p1K1, which is obtained by multiplying the image shift amount p1 by a conversion coefficient K1 that corresponds to the image height of the focus detection region, the diaphragm value of the imaging lens (imaging optical system), and the exit pupil distance, is calculated as the first detected defocus amount Def1.

Second Focus Detection (Refocus Method)

Hereinafter, contrast AF by means of a refocus method according to the present embodiment will be described.

With contrast AF, a focus lens is usually moved when performing shooting in order to obtain an image with a different focus plane. By contrast, in the present embodiment, when a contrast evaluation value is to be calculated for each focus detection line, images corresponding to different positions on the focus lens are generated from an image shot at a specific in-focus distance using the refocus method. Specifically, a second detected defocus amount is detected by generating shift-added signals (refocus signals) for the first focus detection signal and the second focus detection signal, calculating a contrast evaluation value for the shift-added signals, and estimating an MTF (Modulation Transfer Function) peak position for imaging signals based on the contrast evaluation value.

Figure 10:
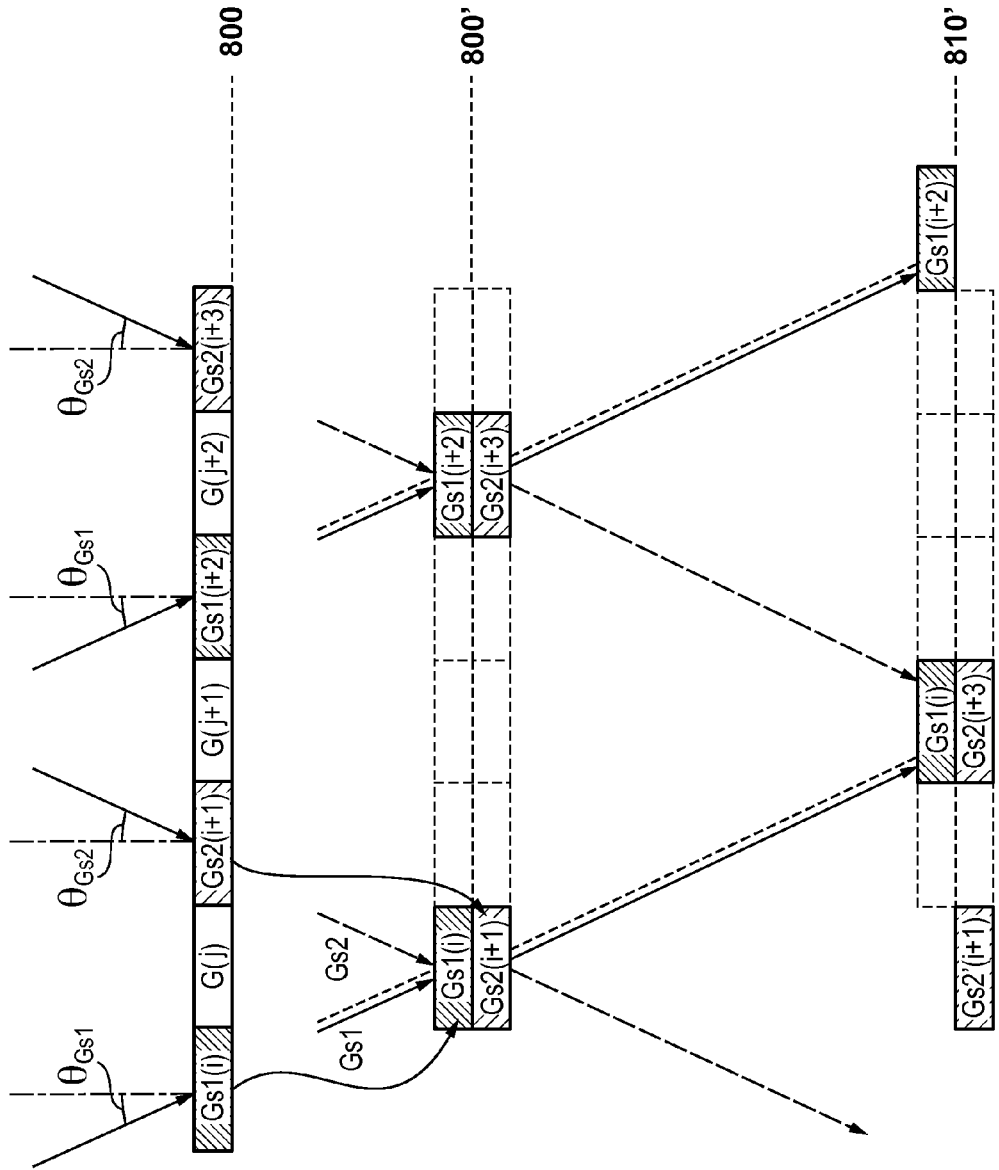
FIG. 10 is a diagram for describing a principle of generating a refocus signal.

An overview of refocus processing in a one-dimensional direction (horizontal direction) using a first focus detection signal and a second focus detection signal will be described with reference to FIG. 10. An image capture plane 800 in FIG. 10 corresponds to the image capture plane 800 shown in FIGS. 5A and 5B. In FIG. 10, letting i and j be integers greater than or equal to 1, the first focus detection signal of the i-th pixel in the horizontal direction of the image sensor arranged in the image capture plane 800 is represented schematically using Gs1(i), and the second focus detection signal of the (i+1)-th pixel is represented schematically using Gs2(i+1). Also, the j-th imaging pixel (here, a G pixel) in the horizontal direction is represented as G(j). As shown in FIG. 2, in the present embodiment, the first focus detection pixels and the second focus detection pixels are arranged alternatingly with imaging pixels interposed therebetween in the horizontal direction of the image sensor 107.

The first focus detection signal Gs1(i) is a light reception signal for light flux incident on the i-th focus detection pixel at a main light beam angle $\theta_{Gs1}$ (corresponds to the first portion 501 in FIGS. 5A and 5B). The second focus detection signal Gs2(i+1) is a light reception signal for light flux incident on the (i+1)-th focus detection pixel at a main light beam angle $\theta_{Gs1}$ (corresponds to the second portion 502 in FIGS. 5A and 5B).

The first focus detection signal Gs1(i) and the second focus detection signal Gs2(i+1) include not only light intensity distribution information, but also incident angle information. Here, shifting the first focus detection signal Gs1(i) by +1 pixel (one pixel in the right direction) in the horizontal direction is equivalent to translating the first focus detection signal Gs1(i) along the angle $\theta_{Gs1}$ to a virtual imaging plane 800'. Similarly, shifting the second focus detection signal Gs2(i+1) in the horizontal direction by −1 pixel (one pixel in the left direction) corresponds to translating the second focus detection signal Gs2(i+1) along the angle $\theta_{Gs2}$ to the virtual imaging plane 800'. Accordingly, a refocus signal (imaging pixel signal) in the virtual imaging plane 800' can be generated by shifting the first focus detection signal Gs1(i+2n) by +1 pixel and the second focus detection signal Gs2(i+2n+1) by −1 pixel and adding them together. Here, n is an integer greater than or equal to 0.

Similarly, a refocus signal (imaging pixel signal) in the virtual imaging plane 810' can be generated by shifting the first focus detection signal Gs1(i+2n) by +3 pixels and the second focus detection signal Gs2(i+2n+1) by −3 pixels and adding them together.

Here, in order to facilitate understanding, a principle of generating a refocus signal in a virtual imaging plane using the arrangement of the focus detection pixels shown in FIG. 2 as-is has been described. Next, generation of refocus signals using the estimated focus detection signals, which is a feature of the present embodiment, will be described with reference to FIG. 11.

Figure 11:
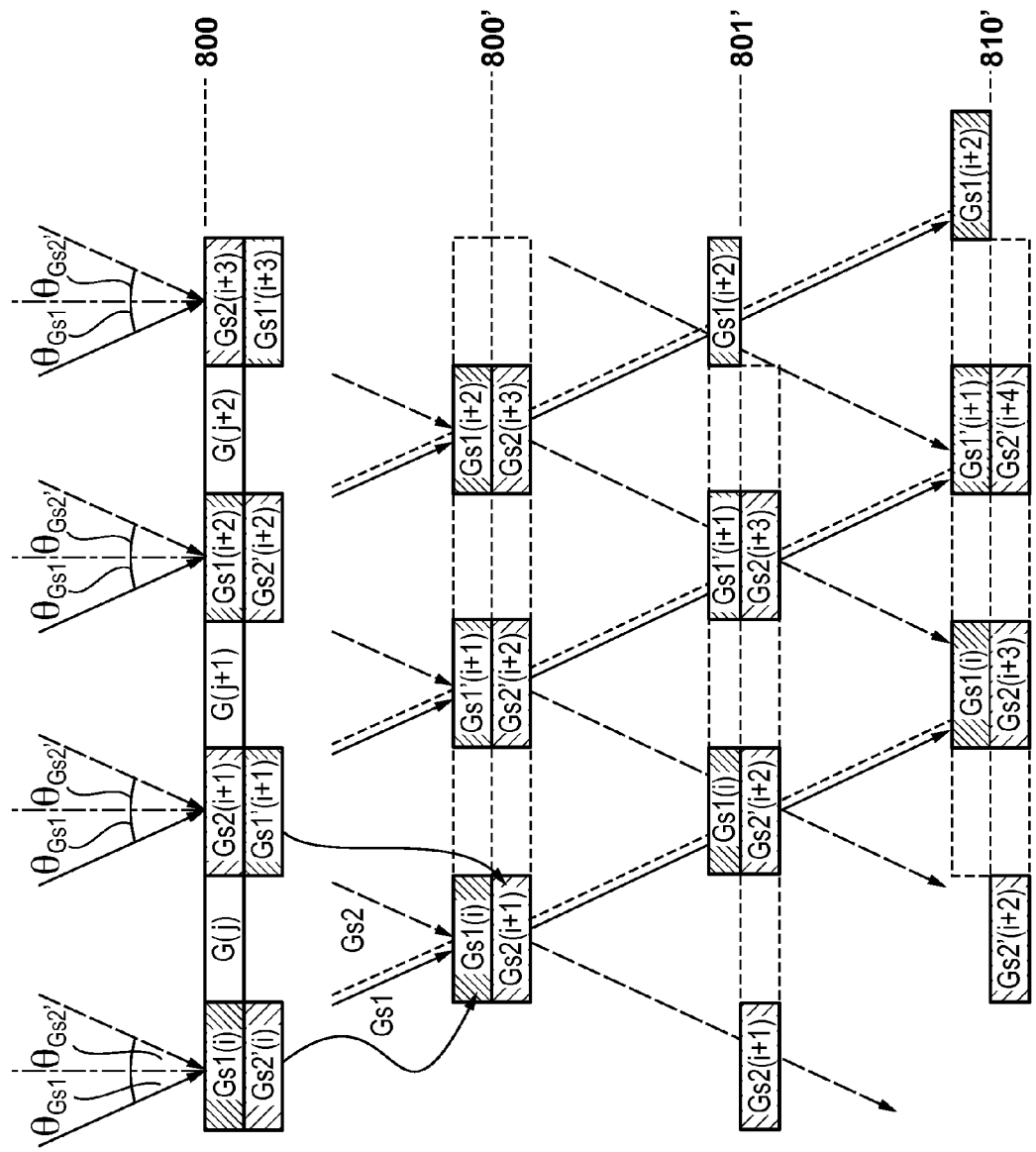
FIG. 11 is a diagram for describing a principle of generating a refocus signal according to an embodiment.

As described above, in the present embodiment, the first focus detection signal and the second focus detection signal can be acquired for the respective focus detection pixel positions using an interpolation calculation. For this reason, it is possible to obtain effects similar to those obtained in the case where the density of the first focus detection pixel and the second focus detection pixel per line has been raised. As a result, as shown in FIG. 11, in addition to raising the density of the refocus signal that can be generated, the interval between the virtual imaging planes can also be made narrower (the virtual imaging plane 801' that cannot be set in FIG. 10 can be set). Accordingly, the precision of the second focus detection, which is contrast AF by means of a refocus method, can be increased. Note that in FIG. 11 as well, the principle of generating the refocus signals in the virtual imaging planes is as described with reference to FIG. 10, and therefore description thereof will not be repeated.

Figure 7B:
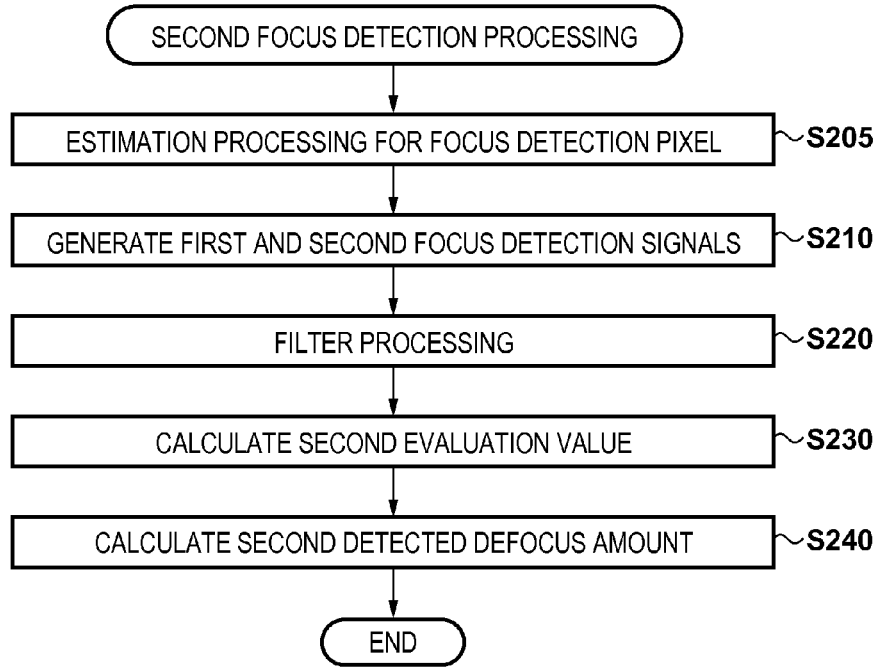

FIG. 7B is a flowchart showing operations for second focus detection carried out by the camera 100 in the present embodiment.

In step S205, the CPU 121 sets the focus detection region in an effective pixel region of the image sensor 107. Also, the CPU 121 sets a range W in the pupil division direction of the focus detection region and a shift range Γ2 for second shift amounts s2 for when the contrast evaluation value is calculated by shifting the first focus detection signal and the second focus detection signal relative to one another in the pupil divided direction. Note that the focus detection region is basically the same as the focus detection region for performing first focus detection, and therefore the focus detection region set in step S110 may be used as-is. In such a case, the shift ranges Γ1 and Γ2 may be the same as well or they may be determined independently.

Also, among the read-out pixels, the CPU 121 executes the above-described focus detection pixel estimation processing based on the signals read out from the multiple first focus detection pixels aligned in the pupil division direction and the signals read out from the second focus detection pixels that form pairs with the multiple first focus detection pixels. If the focus detection pixels are arranged as shown in FIG. 2, the CPU 121 performs estimation processing based on the signals read out from the first focus detection pixels and the second focus detection pixels that exist in the same pixel line.

Then, in step S210, the CPU 121 generates the first focus detection signal from the signals of the multiple first focus detection pixels including the estimated signals, and the second focus detection signal from the signals of the multiple second focus detection pixels including the estimated signals. Note that if a number of signals greater than the number of signals that were actually read out (actual signals) is used, the first focus detection signal and the second focus detection signal may be generated using a portion of a group of signals that make up the estimated signals and the actual signals. Here, all of the estimated signals and actual signals are used to generate the first focus detection signal and the second focus detection signal.

In step S220, the CPU 121 performs filter processing on the first focus detection signal and the second focus detection signal. The broken line and dotted line in FIG. 9 indicate examples of pass bands in the filter processing. With the present invention, focus detection is performed from a small defocus state to nearby the optimal in-focus position using the second focus detection, which is contrast AF by means of a refocus method. Accordingly, the pass band in the filter processing is configured to include a high-frequency band.

Figure 9:
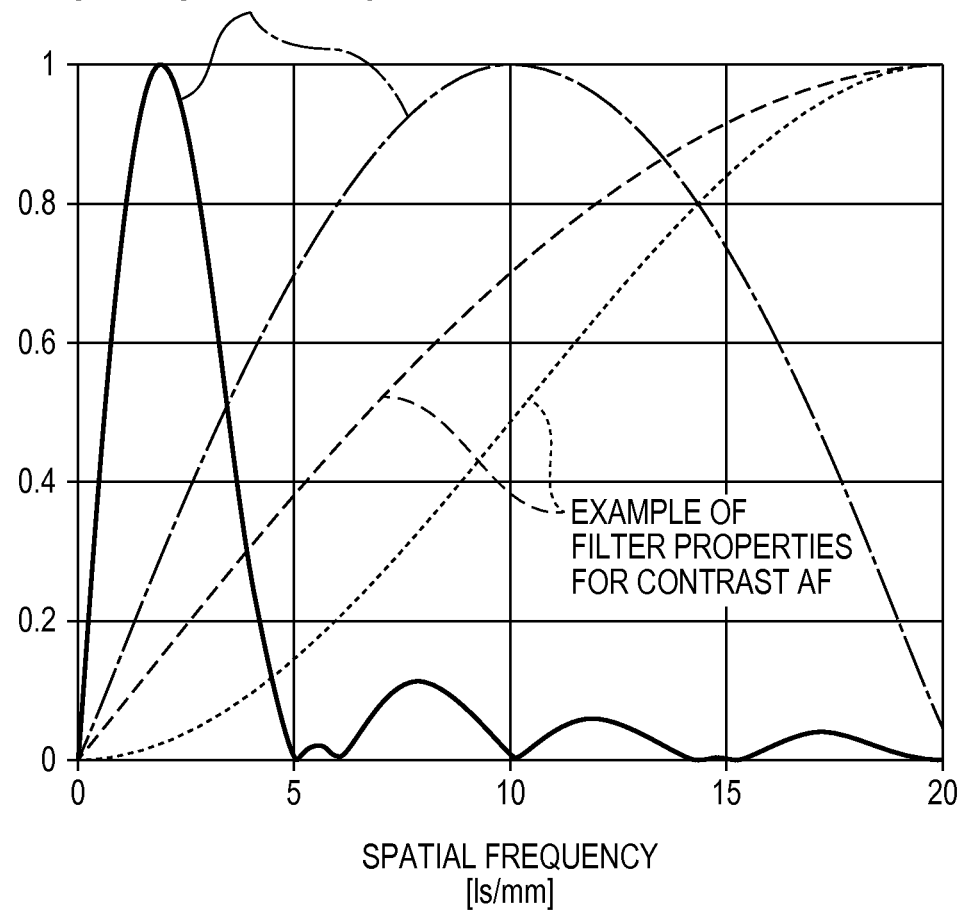
FIG. 9 is a diagram showing an example of frequency properties of a filter applied to a focus detection signal in an embodiment.

A Laplacian (two-stage differential) spatial filter with a filter coefficient [1,−2,1] may be applied as needed so that the pass band in the filter processing is constituted by a higher-frequency band, as indicated by the dotted line in FIG. 9. With this filter processing, edges (high-frequency components) of the subject signal are extracted, whereby the precision of contrast AF focus detection can be improved even further.

In step S230, the CPU 121 generates an image signal in the above-described virtual imaging plane (also referred to as a refocus signal or a shift-added signal) using shift-addition processing in which the first focus detection signal and the second focus detection signal resulting from filter processing are shifted in the pupil division direction relative to each other and added together. Furthermore, a second evaluation value (contrast evaluation value) is calculated based on the generated refocus signal.

Specifically, let Gs1(k) and Gs2(k) respectively be the k-th samples of the first and second focus detection signals resulting from the filter processing, and let W be range of numbers k corresponding to the focus detection region. Also, letting Γ2 be the shift range for the second shift amounts s2, a contrast evaluation value (second evaluation value) RFCON is calculated using equation (6).

$$RFCON(s_2) = \max_{k \in W} |Gs1(k) + Gs2(k - s_2)|, s_2 \in \Gamma 2 \quad (6)$$

The CPU 121 generates a shift-added signal by associating the (k−s2)-th sample Gs2(k−s2) of the second focus detection signal with the k-th sample Gs1(k) of the first focus detection signal and adding them together using shift processing in the pupil division direction for the second shift amounts s2. The CPU 121 further calculates the absolute value of the shift-added signal, obtains the maximum value in the range of the focus detection region W, and calculates the contrast evaluation value RFCON (s2). The contrast evaluation value RFCON (s2) may be calculated by adding the contrast evaluation value calculated for each pixel line in which focus detection pixels are arranged in the focus detection region, to each second shift amount s2 as needed.

In step S240, the CPU 121 calculates the second detected defocus amount Def2 based on the contrast evaluation value. First, based on the added contrast evaluation values, the CPU 121 uses sub-pixel calculation to calculate a shift amount of an actual value at which the added contrast evaluation values are the maximum value (corresponds to MTF peak position) as a peak shift amount p2.

Note that the peak shift amount p2 in this context is not the shift amount in the imaging plane 800 shown in FIG. 11, but is a shift amount in the virtual imaging plane 800'. For this reason, a peak shift amount p2' (=p2+Δ) in the imaging plane 800 is set by correcting a shift amount Δ for setting the first focus detection pixel Gs1(i) and the second focus detection pixel Gs2(i+1) as signals from the same pixel position in the virtual imaging plane 800'.

Next, the CPU 121 calculates the second detected defocus amount Def2 by multiplying the calculated peak shift amount p2' by the second conversion coefficient K2 that corresponds to the image height of the focus detection region, the F-value of the imaging lens (imaging optical system), and the exit pupil distance. The conversion coefficients can be stored in advance in a table format or in the form of calculation formulas, for example. Also, the same value may be used for the first conversion coefficient K1 and the second conversion coefficient K2, according to need.

Thus, in the present embodiment, the second detected defocus amount is calculated by generating the shift-added signals (refocus signals) of the first focus detection signal and the second focus detection signal and calculating the contrast evaluation value based on the shift-added signals. Since the light flux corresponding to the shift-added signals and the light flux corresponding to the imaging pixels, which are imaging signals, approximately coincide with each other, the influence of aberrations in the imaging optical system (spherical aberrations, astigmatism, comatic aberrations, etc.) on the shift-added signals and the influence thereof on the imaging signals approximately coincide with each other.

Accordingly, the in-focus position calculated using contrast AF by means of a refocus method (the focus lens position at which the second detected defocus amount Def2 is 0) and the optimal in-focus position of the imaging signals (MTF peak position of imaging signals) approximately coincide with each other and focus detection can be performed with high precision.

Figure 12A:
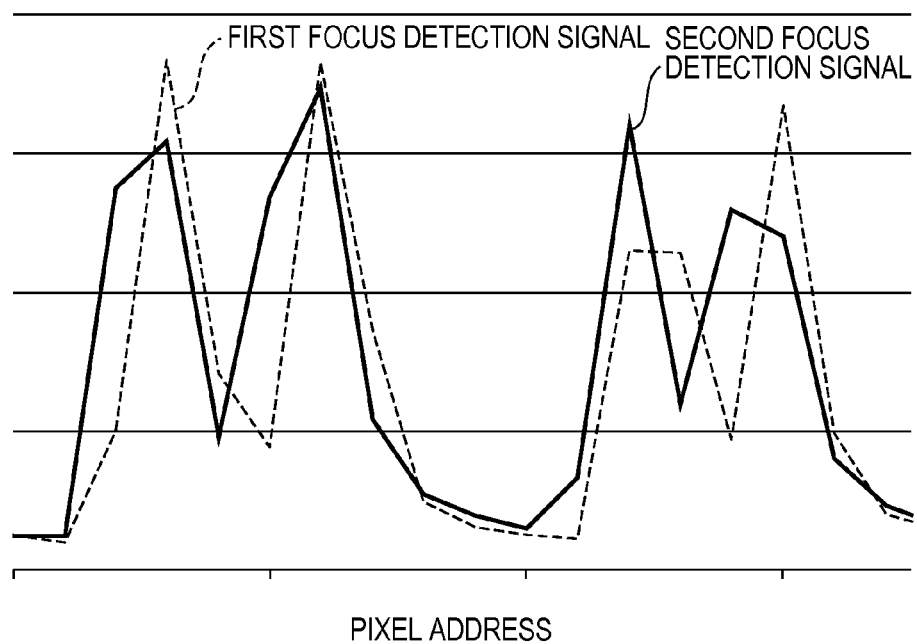
FIGS. 12A and 12B are diagrams showing an example of a first focus detection signal and a second focus detection signal according to an embodiment.

FIG. 12A shows an example of a first focus detection signal (broken line) and a second focus detection signal (solid line) at the optimal in-focus position of the imaging signals. Also, FIG. 12B shows an example of a result of performing filter processing on the first focus detection signal (broken line) and the second focus detection signal (solid line) in FIG. 12A.

Figure 12B:
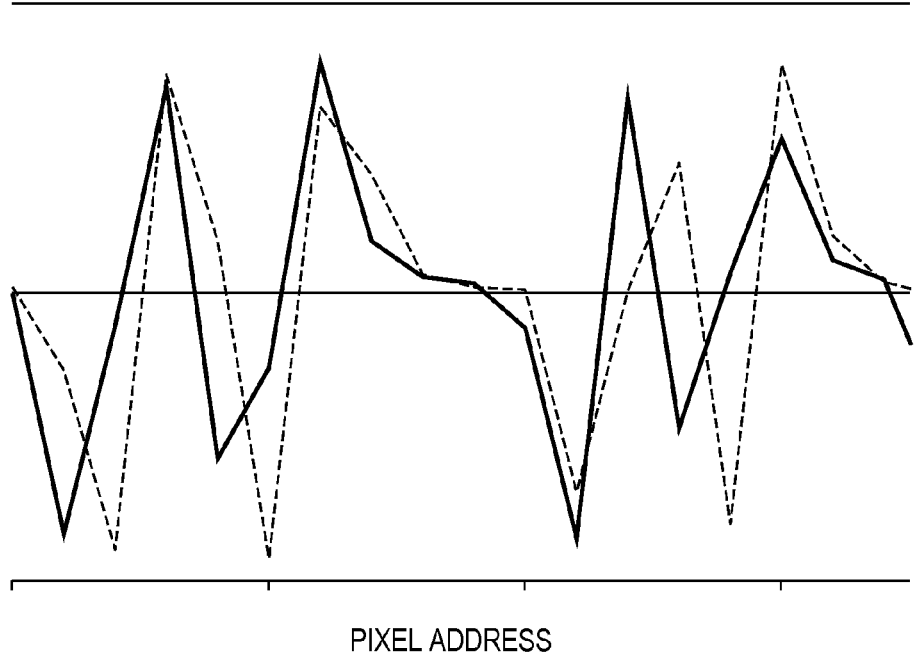
Figure 13A:
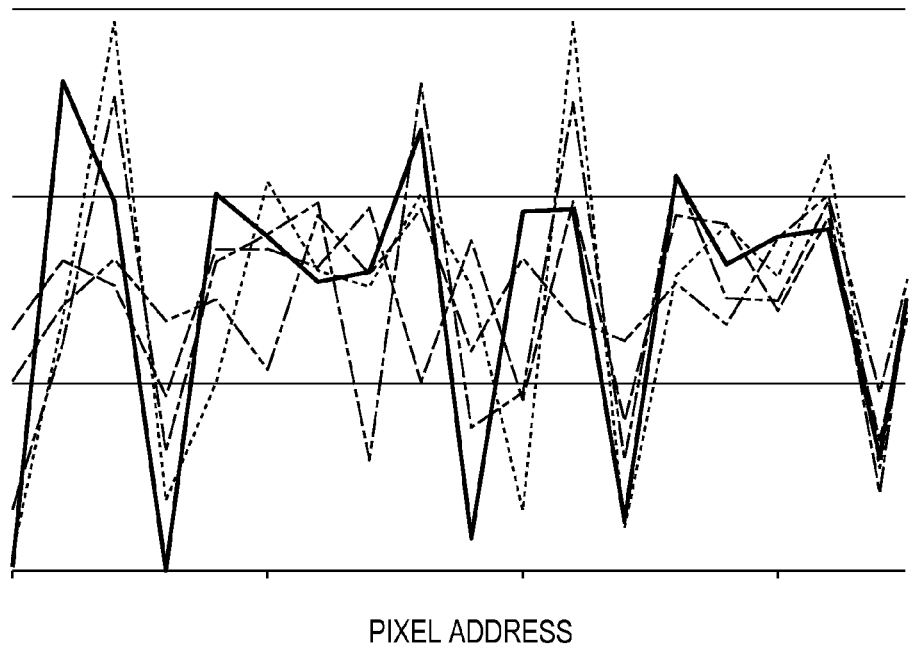
FIGS. 13A and 13B are diagrams showing an example of a refocus signal and a contrast evaluation value according to an embodiment.
Figure 13B:
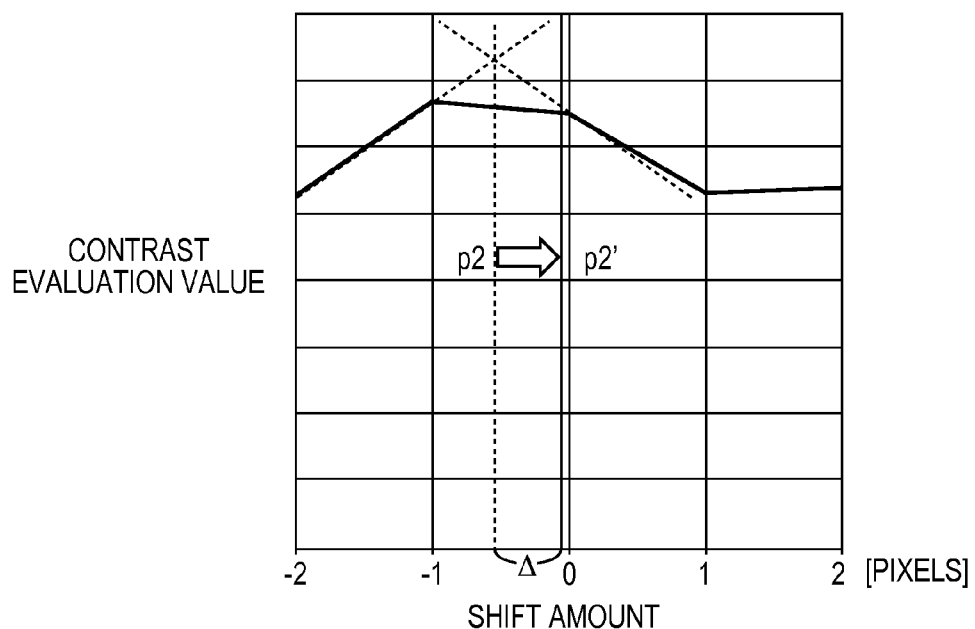

Also, FIG. 13A shows an example of shift-added signals (refocus signals) corresponding to relative shift amounts (−2, −1, 0, 1, 2 [pixels]) of the first focus detection signal (broken line) and the second focus detection signal (solid line) in FIG. 12B. Based on FIG. 13A, it can be understood that the peak value of the shift-added signal changes according to the shift amount. FIG. 13B shows an example of a contrast evaluation value (second evaluation value) calculated from the shift-added signals shown in FIG. 13A. FIG. 13B further shows a peak shift amount p2 obtained using sub-sample calculation and a peak shift amount p2' obtained by correcting the peak shift amount p2 using a shift amount A during refocus signal generation. The first focus detection signal and the second focus detection signal used here are signals obtained at the optimal in-focus position for the imaging signals, and therefore it is ideal that the peak shift amount p2'=0 is satisfied. As shown in FIG. 13B, it can be understood that the shift amount between the peak shift amount p2' and the shift amount 0 is suppressed to a small amount, and focus detection can be performed with high precision.

Range in which Refocus is Possible

Note that since there is a limit to the range in which the refocus signals can be generated (distance between the imaging plane and the virtual imaging plane), the range of defocus amounts at which high-precision focus detection is possible using contrast AF by means of a refocus method is also limited.

FIG. 14 shows a diagram schematically illustrating the range in which refocusing is possible according to the present embodiment. Description of reference numerals that are the same as those used in FIG. 5B will not be included here. Letting 6 be the allowable circle of confusion and F be the diaphragm value of the imaging optical system, the depth of field at diaphragm value F is $\pm F\delta$. With respect to the size of the imaging pixels, the size of the light reception portion of the focus detection pixels of the present embodiment are $1/N_H$ ($N_H=2$) in the horizontal direction and $N_V$ ($N_V=1$) in the vertical direction. For this reason, the actual effective diaphragm value $F_{01}$ in the horizontal direction of the pupil area corresponding to the light reception portion of the focus detection pixel darkens such that $F_{01}=N_H F$.

Accordingly, the effective depth of field of the focus detection signals is $\pm N_H F\delta$, which is deeper than the effective depth of field of the imaging pixels by a factor of $N_H$, and the in-focus range is wider by a factor of $N_H$. In the range of the effective depth of field $\pm N_H F\delta$, in-focus subject images are obtained for each focus detection signal. This applies to the first and second focus detection signals. Accordingly, in the range of the enlarged depth of field, it is possible to perform refocus processing in which the first focus detection signal (second focus detection signal) is translated along the main light beam angle $\theta_{Gs1}$ ($\theta_{Gs2}$) shown in FIG. 10. Accordingly, the adjusted defocus amount |d'| from the imaging plane, which corresponds to the range of the virtual imaging plane that can be realized using refocus processing in which focus detection signals obtained in the current imaging plane are used, is shown in equation (7).

$$|d'| \le N_H F\delta \quad (7)$$

Thus, the range of defocus amounts at which focus detection can be performed with high precision using contrast AF by means of a refocus method is approximately limited to the range in equation (7), which is normally less than or equal to the defocus range in which focus detection is possible using phase-difference AF. Accordingly, with the present embodiment, the range of the second shift amounts s2 during contrast AF by means of a refocus method is configured to be less than or equal to the range of the first shift amounts s1 during phase-difference AF.

Also, with the present embodiment, phase-difference AF is used for focus adjustment from a large defocus state to a small defocus state of the imaging optical system, and contrast AF by means of a refocus method is used for focus adjustment from the small defocus state to nearby the optimal in-focus position. Accordingly, the pass band for filter processing applied in step S220 in the second focus detection includes a band that is higher in frequency than the normal band for filter processing applied in step S130 in the first focus detection.

With the image sensor of the present invention, the light flux received by the focus detection pixels and the light flux received by the imaging pixels are different, and the influence of aberrations in the imaging optical system (spherical aberrations, astigmatism, comatic aberrations, etc.) on the focus detection signals and the influence thereof on the imaging signals are different. The smaller the diaphragm value of the imaging optical system is (the closer it is to release), the larger the difference is. For this reason, if the diaphragm value of the imaging optical system is small (close to release), there is a risk that a difference will appear between the detected in-focus position calculated using phase-difference AF (position at which the first detected defocus amount is 0) and the optimal in-focus position of the imaging signal (MTF peak position of imaging signal). In other words, if the diaphragm value of the imaging optical system is less than or equal to a predetermined value, there is a risk that the precision of focus detection by means of the first focus detection according to the phase-difference detection method will decrease. Accordingly, if the diaphragm value of the imaging optical system is less than or equal to the predetermined diaphragm value, high-precision focus detection can be performed by carrying out contrast AF by means of a refocus method (second focus detection) in addition to phase-difference AF (first focus detection).

Processing Flow of Focus Detection Processing

Figure 15:
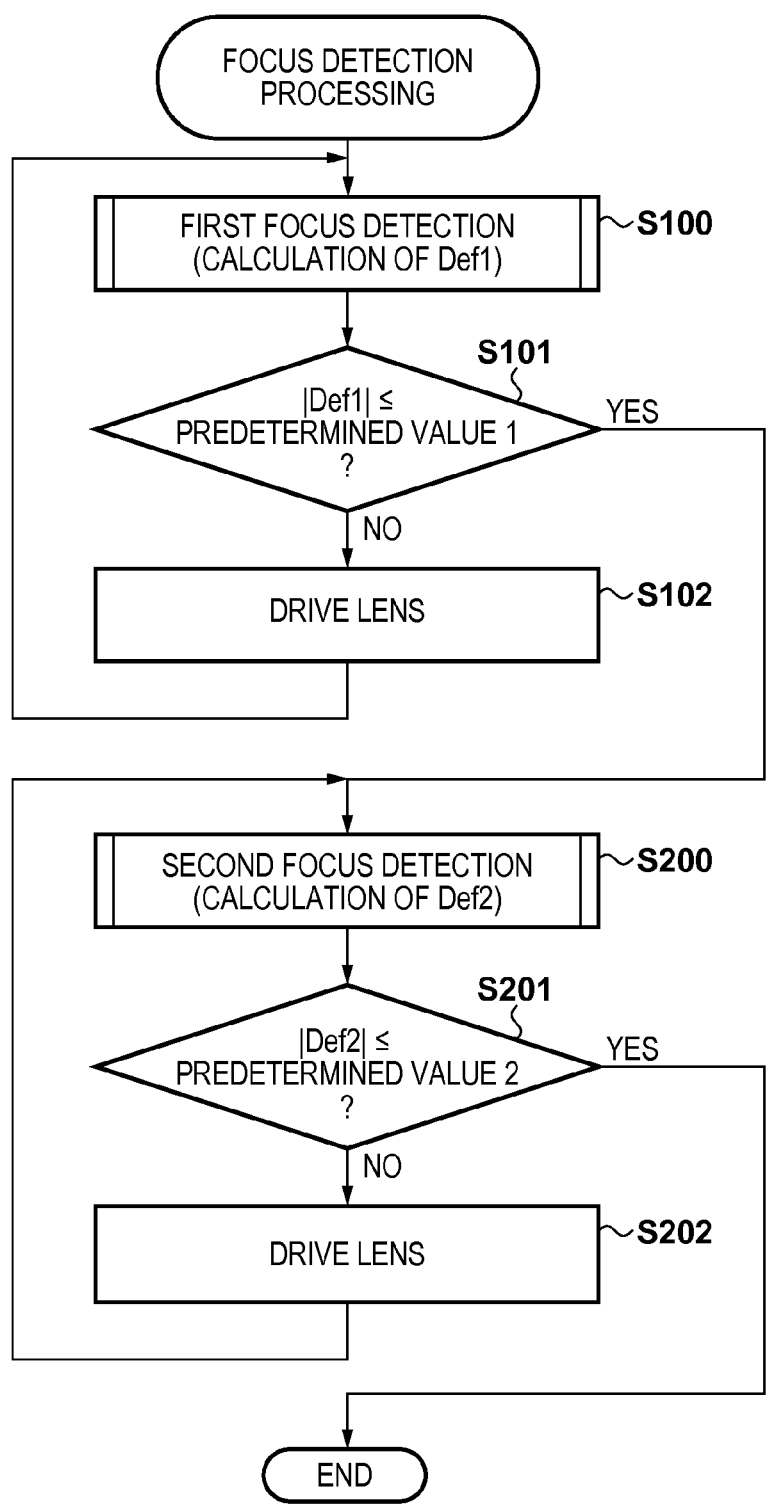
FIG. 15 is a flowchart showing an example of focus detection processing according to an embodiment.

The flowchart in FIG. 15 shows an overview of overall operations for focus detection processing in which phase-difference AF and contrast AF by means of a refocus method are combined, according to the present embodiment. In the present embodiment, focus adjustment from a large defocus state to a small defocus state is performed by driving the focus lens based on the defocus amount Def1 detected using phase-difference AF (first focus detection) until the absolute value of the defocus amount of the imaging optical system is less than or equal to a first predetermined threshold value. Thereafter, when the absolute value of the defocus amount Def1 of the imaging optical system is less than or equal to the first predetermined threshold value, the focus lens is driven based on a defocus amount Def2 detected with contrast AF by means of a refocus method (second focus detection). Focus adjustment from the small defocus state to nearby the optimal in-focus position is performed by driving the focus lens based on the defocus amount Def2 until the absolute value of the defocus amount Def2 is less than or equal to a second predetermined threshold value (<first predetermined threshold value). Note that focus detection performed until the defocus amount is less than or equal to the first predetermined threshold value need not be performed using phase-difference AF.

In step S100, the CPU 121 detects the first detected defocus amount (Def1) using the first focus detection (phase-difference AF) shown in FIG. 7A. In step S101, the CPU 121 determines whether or not the absolute value |Def1| of the detected first defocus amount Def1 is greater than a predetermined value 1, and if it is greater, in step S102, the CPU 121 drives the focus lens 105 according to the first detected defocus amount (Def1) and returns to the processing of step S100.

If the absolute value |Def1| of the first defocus amount Def1 is less than or equal to the predetermined value 1 in step S101, the CPU 121 moves to the processing of step S200 and detects the second detected defocus amount Def2 using the second focus detection (contrast AF by means of a refocus method) shown in FIG. 7B. In step S201, the CPU 121 determines whether or not the absolute value |Def2| of the second defocus amount Def2 is greater than a predetermined value 2 (<predetermined value 1), and if it is greater, in step S201, the CPU 121 drives the focus lens 105 according to the second detected defocus amount Def2 and returns to the processing of step S200.

In step S201, if the absolute value |Def2| of the second detected defocus amount Def2 is less than or equal to the predetermined value 2, the CPU 121 ends the focus detection processing.

Modified Example of Focus Detection Processing

Note that results of focus detection can be obtained at a high speed by processing the first focus detection and the second focus detection in parallel. This kind of focus detection processing will be described with reference to the flowchart shown in FIG. 16. Note that in FIG. 16, steps in which operations that are the same as in FIG. 15 are performed are denoted by the same reference numerals, and redundant description thereof is not included.

Figure 16:
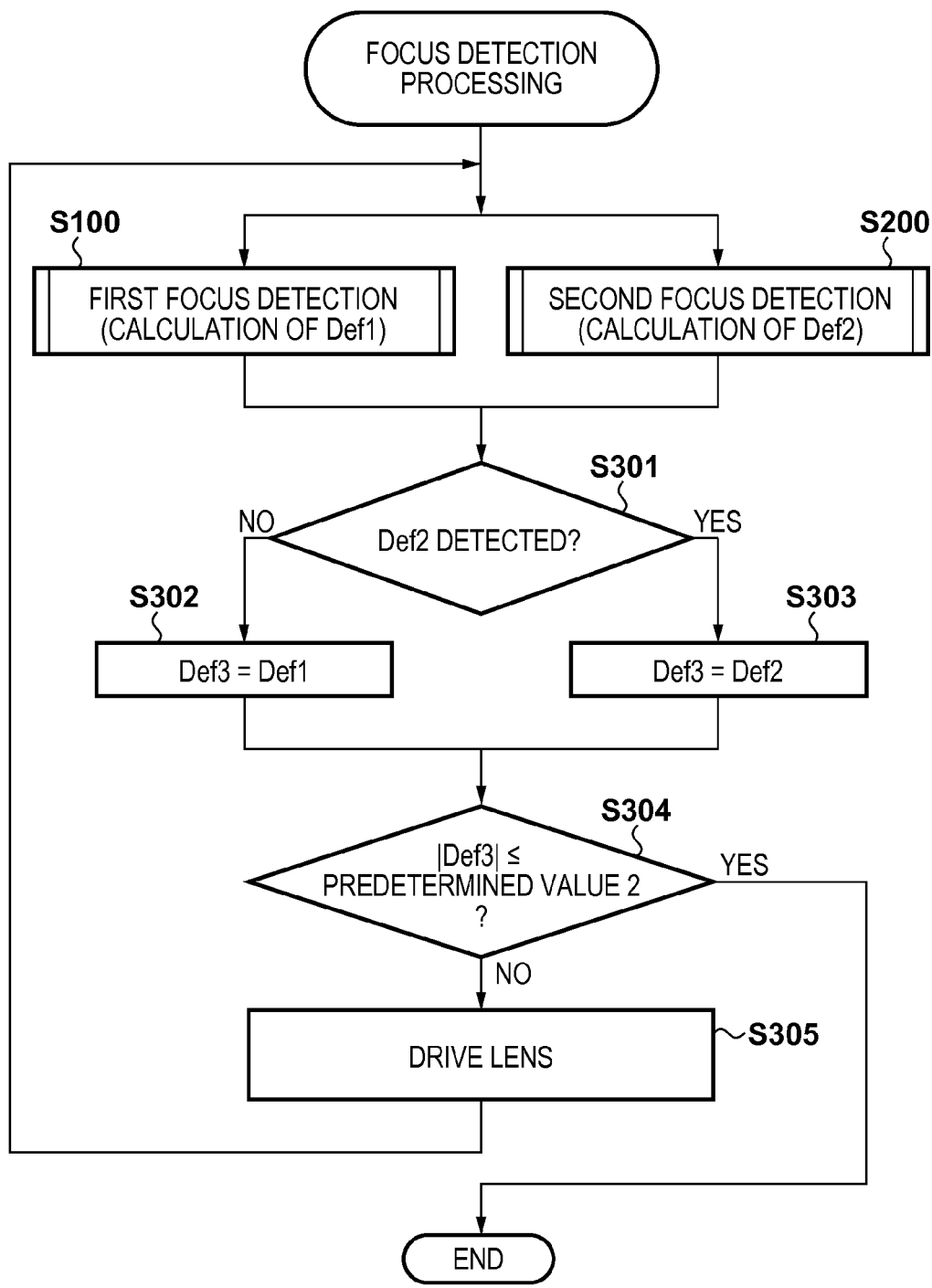
FIG. 16 is a flowchart showing another example of focus detection processing according to an embodiment.

In step S100 in FIG. 16, the CPU 121 calculates the first detected defocus amount Def1 using first focus detection according to the phase-difference detection method. Also, at the same time, the CPU 121 calculates the second detected defocus amount Def2 using second focus detection by means of a refocus method in step S200.

In step S301, the CPU 121 determines whether or not the second detected defocus amount Def2 has been calculated. The determination in this context may be a determination of whether or not the second detected defocus amount Def2 is within the range of defocus amounts at which focus detection can be performed with high precision using contrast AF by means of a refocus method shown in equation (7).

If it is determined in step S301 that the second detected defocus amount Def2 has been calculated, the CPU 121 uses the second detected defocus amount Def2 as the third detected defocus amount Def3 in step S303. On the other hand, if it is not determined that the second detected defocus amount Def2 has been calculated, the CPU 121 uses the first detected defocus amount Def1 as the third detected defocus amount Def3 in step S302.

In step S304, the CPU 121 determines whether or not the absolute value |Def3| of the third defocus amount Def3 is greater than the above-described predetermined value 2, and if it is greater, in step S305, the CPU 121 drives the focus lens 105 according to the third detected defocus amount Def3 and returns to the processing of steps S100 and S200. If the absolute value |Def3| of the third defocus amount Def3 is less than or equal to the predetermined value 2, the CPU 121 ends focus detection processing.

As described above, according to the present embodiment, precise focus detection can be realized by using an image sensor with focus detection pixels arranged discretely. Specifically, the defocus amount is detected using refocus signals generated using estimated signals of focus detection pixels in addition to signals of focus detection pixels arranged at discrete positions. For this reason, the refocus signals can be generated by using a greater number of focus detection signals than the number of focus detection pixels that actually exist, and the virtual image capture plane can be set more finely, and therefore precise detection of the defocus amount can be realized.

Also, since it is no longer necessary to increase the density of focus detection pixels, which are treated as defective pixels, in order to improve the precision of focus detection, a decrease in image quality in a captured image can be suppressed. Furthermore, if the estimated signals of the focus detection pixels are used in focus detection by means of the phase-difference detection method, the degree of similarity between a pair of focus detection signals can be increased, and an increase in the precision of focus detection by means of the phase-difference detection method can also be realized.

Other Embodiments

Also, the present invention is realized by executing the following processing as well. That is to say, it is realized by executing processing in which software (a program) for realizing the functions of the above-described embodiment is supplied to a system or device via a network or a type of storage medium, the processing being executed by a computer (or CPU, MPU, etc.) in the system or device reading out the program.

Note that in the above-described embodiment, a configuration was described in which focus detection pixels are used as pixels in which the angle of the incident light flux is restricted (the pupil area corresponding to the incident light flux is a partial pupil area), but with the present invention, the signals used for generating the refocus signals do not need to be signals of focus detection pixels.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-159765, filed Aug. 5, 2014, which is hereby incorporated by reference herein in its entirety.

What is claimed is:

1. A focus detection apparatus comprising:
one or more processors; and
a memory storing instructions which, when executed by the one or more processors, cause the focus detection apparatus to function as:
an acquisition unit;
an estimation unit; and
a focus detection unit, wherein:
the acquisition unit acquires signals of pixels from an image sensor in which a first pixel, a second pixel, and an imaging pixel are arranged, the first pixel receiving light flux that is restricted to light flux passing through a first portion of a pupil area of an imaging optical system, the second pixel receiving light flux that is restricted to light flux passing through a second portion that is different from the first portion of the pupil area, and the imaging pixel being different from the first and second pixels;
the estimation unit estimates, based on the acquired signals, a first estimated signal corresponding to the first pixel at a position at which the first pixel is not arranged, and a second estimated signal corresponding to the second pixel at a position at which the second pixel is not arranged; and
the focus detection unit calculates a defocus amount of the imaging optical system based on a first signal constituted by the first estimated signal and the signal from the first pixel, and a second signal constituted by the second estimated signal and the signal from the second pixel.

2. The focus detection apparatus according to claim 1, wherein
the estimation unit estimates a signal corresponding to the second pixel at a location at which the first pixel is arranged, and a signal corresponding to the first pixel at a location at which the second pixel is arranged.

3. The focus detection apparatus according to claim 1, wherein
the estimation unit uses a signal from the second pixel nearby the position at which the first pixel is arranged to interpolate the second estimated signal at the position at which the first pixel is arranged, and uses a signal from the first pixel nearby the position at which the second pixel is arranged to interpolate the first estimated signal at the position at which the second pixel is arranged, and thereby performs estimation.

4. The focus detection apparatus according to claim 1, wherein
the estimation unit estimates the second estimated signal at the position at which the first pixel is arranged, based on the signal from the first pixel and the signal of the imaging pixel at that position, which is obtained by interpolation using the signal of the imaging pixel nearby that position.

5. The focus detection apparatus according to claim 1, wherein
the estimation unit estimates the first and second estimated signals using a signal from an imaging pixel having a color filter with the same color as the first and second pixels.

6. The focus detection apparatus according to claim 1, wherein
based on a plurality of evaluation values obtained by shifting the first signal and the second signal relative to one another, the focus detection unit calculates a peak shift amount at which an evaluation value reaches a peak, and calculates the defocus amount based on the peak shift amount.

7. The focus detection apparatus according to claim 6, wherein
each of the plurality of evaluation values is an evaluation value in a virtual imaging plane with a distance, from an imaging plane of the image sensor, corresponding to a shift amount between the first signal and the second signal.

8. The focus detection apparatus according to claim 1, wherein
the focus detection unit detects the defocus amount based on a contrast evaluation value for a signal obtained by shifting the first signal and the second signal relative to one another and adding them together.

9. The focus detection apparatus according to claim 1, wherein
based on a plurality of evaluation values obtained by shifting the first signal and the second signal relative to one another, the focus detection unit calculates a defocus amount of the imaging optical system using a phase-difference detection method.

10. An image capture apparatus comprising:
an image sensor in which a first pixel, and second pixel, and an imaging pixel are arranged, the first pixel receiving light flux that is restricted to light flux passing through a first portion of a pupil area of an imaging optical system, the second pixel receiving light flux that is restricted to light flux passing through a second portion that is different from the first portion of the pupil area, and the imaging pixel being different from the first and second pixels;
one or more processors; and
a memory storing instructions which, when executed by the one or more processors, cause the image capture apparatus to function as:
a focus detection apparatus that comprises an acquisition unit an estimation unit, and a focus detection unit; and
an adjustment unit that adjusts a focal point of the imaging optical system based on the defocus amount detected by the focus detection apparatus, wherein:
the acquisition unit acquires signals of pixels from an image sensor in which a first pixel, a second pixel, and an imaging pixel are arranged, the first pixel receiving light flux that is restricted to light flux passing through a first portion of a pupil area of an imaging optical system, the second pixel receiving light flux that is restricted to light flux passing through a second portion that is different from the first portion of the pupil area, and the imaging pixel being different from the first and second pixels;

the estimation unit estimates, based on the acquired signals, a first estimated signal corresponding to the first pixel at a position at which the first pixel is not arranged, and a second estimated signal corresponding to the second pixel at a position at which the second pixel is not arranged; and the focus detection unit calculates a defocus amount of the imaging optical system based on a first signal constituted by the first estimated signal and the signal from the first pixel, and a second signal constituted by the second estimated signal and the signal from the second pixel.

11. The image capture apparatus according to claim 10, wherein
the imaging pixel receives light flux passing through the pupil area, which includes the first portion and the second portion.

12. The image capture apparatus according to claim 10, wherein
the focus detection unit detects a first defocus amount of the imaging optical system based on a contrast evaluation value for the signal obtained by shifting the first signal and the second signal relative to each other and adding them together, and detects a second defocus amount of the imaging optical system using a phase-difference detection method based on the evaluation value obtained by shifting the first signal and the second signal relative to one another, and
the adjustment unit
adjusts the focal point of the imaging optical system based on the second defocus amount until the second defocus amount becomes less than or equal to a predetermined value, and
adjusts the focal point of the imaging optical system based on the first defocus amount when the second defocus amount is less than or equal to a predetermined value.

13. The image capture apparatus according to claim 10, wherein
the adjustment unit
adjusts the focal point of the imaging optical system based on the first defocus amount if the first defocus amount has been obtained.

14. The image capture apparatus according to claim 12, wherein
the predetermined value is based on a depth of field of the signal of the focus detection pixel.

15. A method for controlling a focus detection apparatus, the method comprising:
an acquisition step of acquiring signals of pixels from an image sensor in which a first pixel, a second pixel, and an imaging pixel are arranged, the first pixel receiving light flux that is restricted to light flux passing through a first portion of a pupil area of an imaging optical system, the second pixel receiving light flux that is restricted to light flux passing through a second portion that is different from the first portion of the pupil area, and the imaging pixel being different from the first and second pixels;
an estimation step of, based on the acquired signals, estimating a first estimated signal corresponding to the first pixel at a position at which the first pixel is not arranged, and a second estimated signal corresponding to the second pixel at a position at which the second pixel is not arranged; and
a focus detection step of calculating a defocus amount of the imaging optical system based on a first signal constituted by the first estimated signal and the signal from the first pixel, and a second signal constituted by the second estimated signal and the signal from the second pixel.

16. The image capture apparatus according to claim 10, wherein the first signal and the second signal are filtered for the second defocus amount in a phase-difference method such that a pass band in a filter processing of the phase-difference method is configured to include a lower-frequency band than that for the contrast evaluation value.

17. The image capture apparatus according to claim 10, wherein shading correction processing are performed to the first signal and the second signal.

18. The image capture apparatus according to claim 17, wherein the shading correction processing are performed to the first signal and the second signal using shading correction coefficient according to an image height, a diaphragm value of the imaging optical system, and an exit pupil distance.

* * * * *